(12) United States Patent  
Coombs

(10) Patent No.: US 8,849,513 B2  
(45) Date of Patent: Sep. 30, 2014

(54) MODULAR CONTROL SYSTEM

(75) Inventor: Joshua D. Coombs, East Lansing, MI (US)

(73) Assignee: Air Lift Company, Lansing, MI (US)

( * ) Notice: Subject to any disclaimer, the term of this patent is extended or adjusted under 35 U.S.C. 154(b) by 506 days.

(21) Appl. No.: 11/928,859

(22) Filed: Oct. 30, 2007

(65) Prior Publication Data

US 2010/0138116 A1 Jun. 3, 2010

Related U.S. Application Data

(60) Provisional application No. 60/855,274, filed on Oct. 30, 2006.

(51) Int. Cl.
| | | |
|---|---|---|
| *B60G 17/015* | (2006.01) | |
| *G06F 17/00* | (2006.01) | |
| *B60G 17/052* | (2006.01) | |
| *B60G 17/018* | (2006.01) | |
| *B60R 16/02* | (2006.01) | |

(52) U.S. Cl.
CPC ...... *B60G 17/0523* (2013.01); *B60G 2600/202* (2013.01); *B60G 2500/203* (2013.01); *B60G 2600/04* (2013.01)
USPC .............................................. 701/37; 701/48

(58) Field of Classification Search
USPC .............. 280/124.157–159, 124.16; 417/282; 701/37, 48
See application file for complete search history.

(56) References Cited

U.S. PATENT DOCUMENTS

| | | | | |
|---|---|---|---|---|
| 6,921,100 B2* | 7/2005 | Mantini et al. | ................ | 280/407 |
| 7,287,760 B1* | 10/2007 | Quick et al. | ................ | 280/5.512 |
| 7,487,973 B1* | 2/2009 | Kesselgruber et al. | ..... | 280/5.506 |
| 2005/0017474 A1* | 1/2005 | Heer | ........................ | 280/124.16 |
| 2005/0065680 A1* | 3/2005 | Kawauchi et al. | ............... | 701/29 |
| 2005/0146098 A1* | 7/2005 | Green et al. | ............... | 280/5.508 |
| 2006/0267297 A1* | 11/2006 | Nordmeyer et al. | ........ | 280/5.515 |
| 2007/0007734 A1* | 1/2007 | Brookes et al. | ............ | 280/6.157 |
| 2007/0270006 A1* | 11/2007 | Herges | .......................... | 439/174 |

FOREIGN PATENT DOCUMENTS

EP        0372218 A2 *  6/1990  ........... B60G 17/015

* cited by examiner

*Primary Examiner* — Khoi H. Tran
*Assistant Examiner* — Dale Moyer
(74) *Attorney, Agent, or Firm* — Warner Norcross & Judd LLP

(57) ABSTRACT

A modular control system (500, 510) is disclosed for providing for modular control functions within vehicles. One embodiment of the modular control system (500) includes a driver interface unit (502) for controlling one or more air control units (504) through wireless communications. The air control units (504) can control functions such as air spring pressure, air spring height and the like. Another embodiment of the modular control system (510) uses a driver interface unit (512) for controlling air control units (518) through wire applications (514, 516).

10 Claims, 13 Drawing Sheets

PRESSURE CONTROL

HEIGHT CONTROL

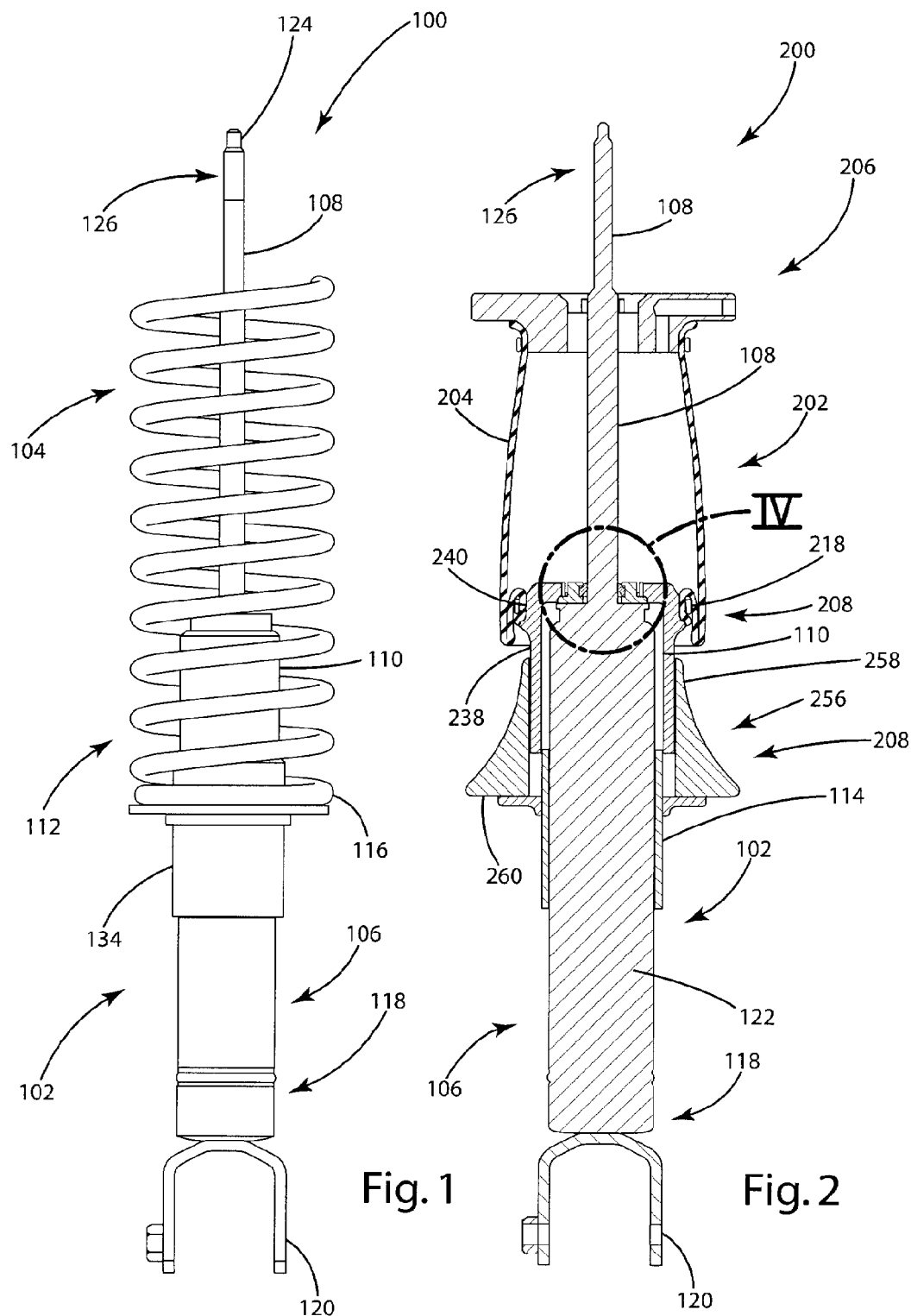

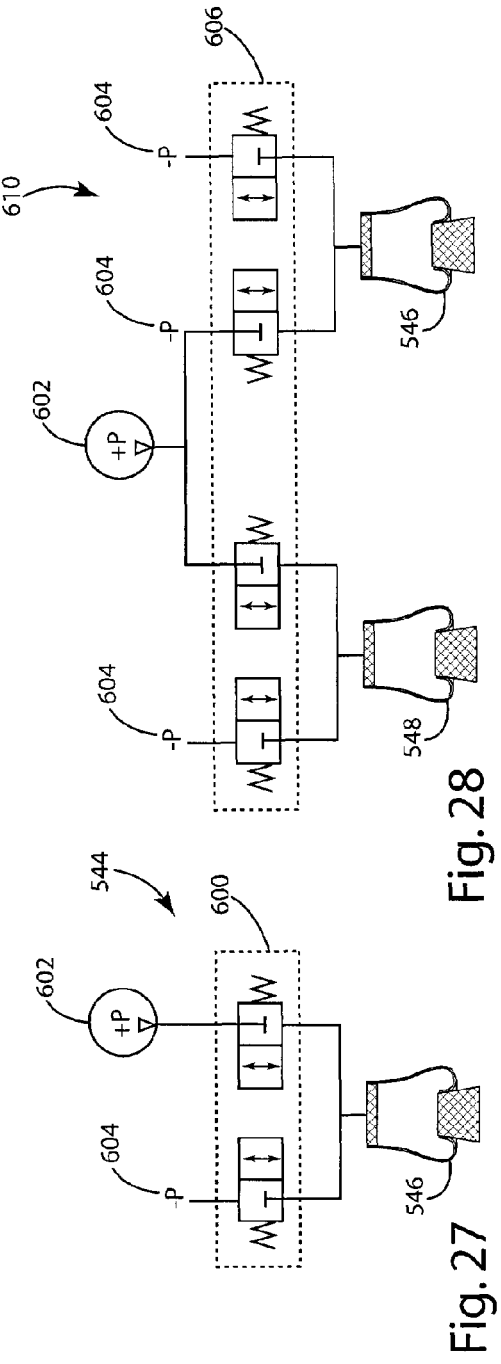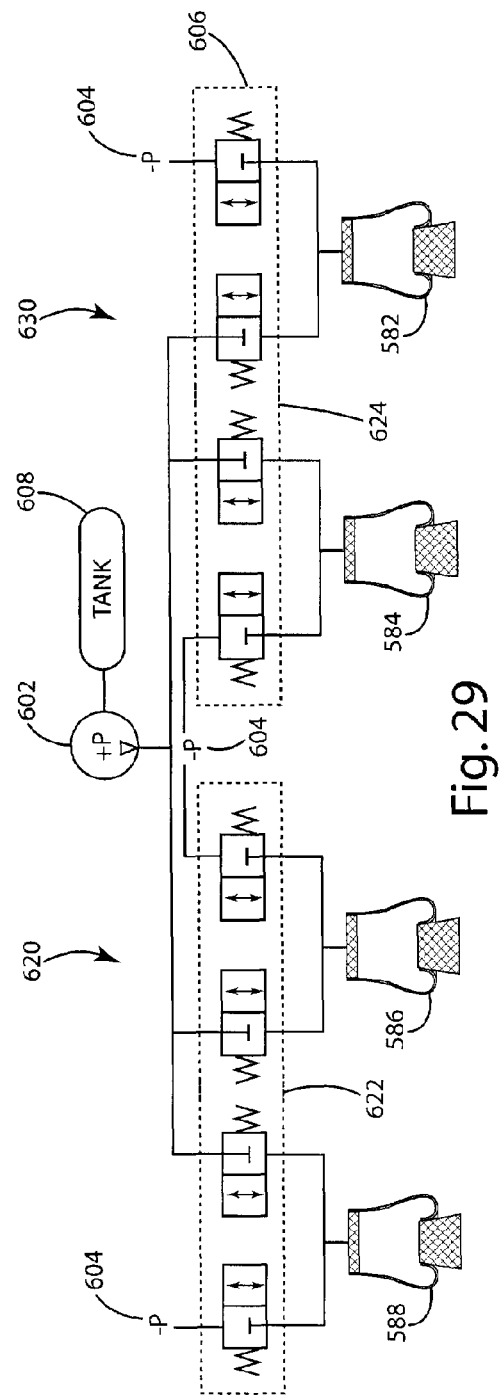

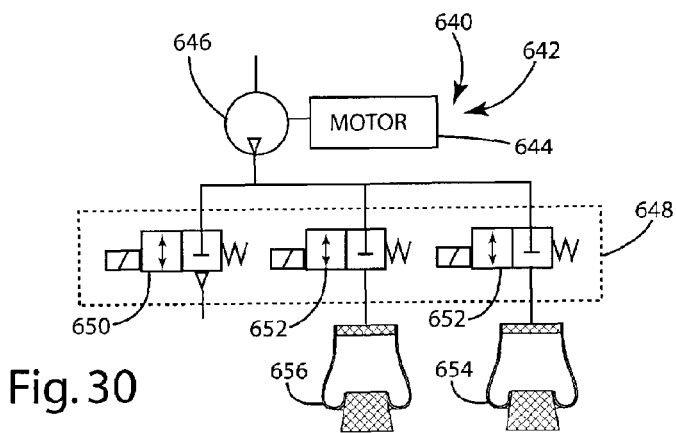
Fig. 30
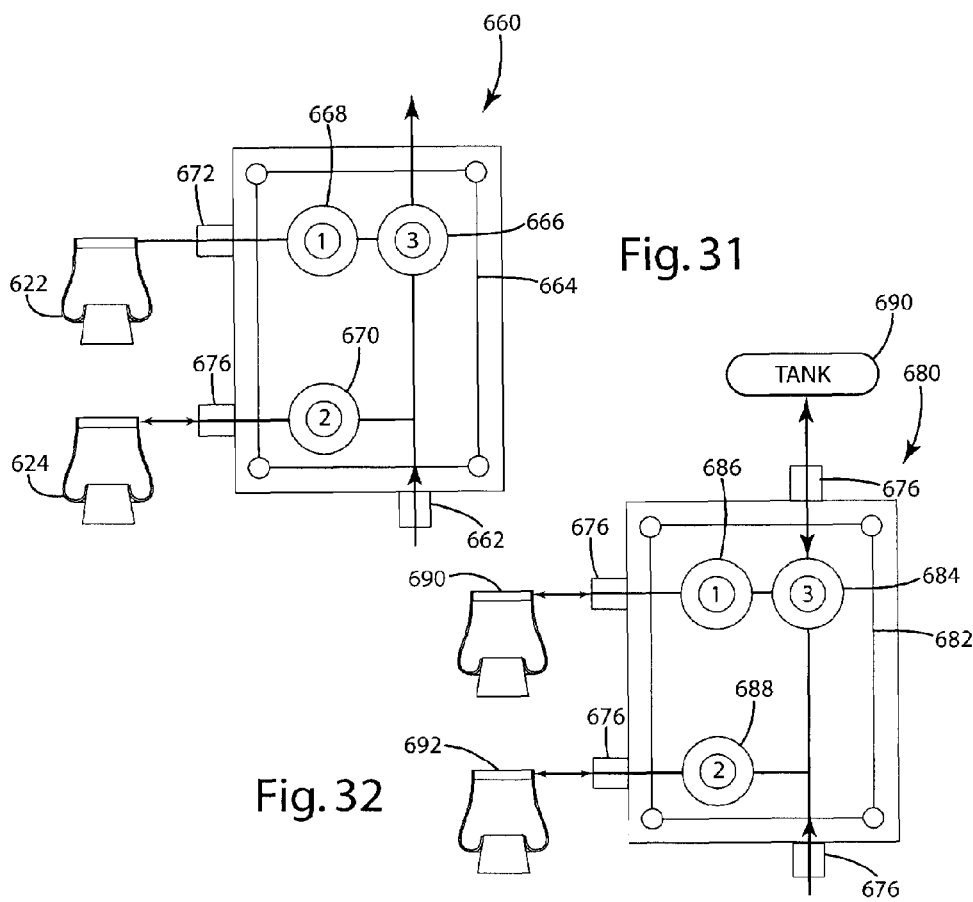
Fig. 31
Fig. 32

MODULAR CONTROL SYSTEM

CROSS-REFERENCE TO RELATED APPLICATIONS

This application is based on and claims priority of U.S. Provisional Patent Application Ser. No. 60/855,274 filed Oct. 30, 2006.

STATEMENT REGARDING FEDERALLY SPONSORED RESEARCH OR DEVELOPMENT

Not applicable.

REFERENCE TO A MICROFISHE APPENDIX

Not applicable.

BACKGROUND OF THE INVENTION

1. Field of the Invention

The invention relates to suspension systems and, more particularly, relates to a modular control system designed for the vehicle aftermarket that allows wired or wireless communication with multiple electronically controlled services, including air suspensions, adjustable dampers, engine controllers and the like.

2. Background Art

The invention for which an example embodiment is described herein relates to modular control systems associated particularly with various types of vehicles. For purposes of description, the example embodiment of the modular control system in accordance with the invention will be described with respect to air suspension systems. Accordingly, the following paragraphs will generally describe one type of suspension system, primarily as background. This system is one which is often characterized as an "air-over" suspension system.

Various types of shock absorbers and other suspension devices are known in the vehicle industries. These devices are typically utilized so as to dampen the effects of projections (i.e. bumps) or apertures (i.e. potholes) on roadways for "smoothing" the ride for automobiles, trucks and the like. That is, the shock absorbers comprise mechanical devices designed to smooth out or dampen sudden shock impulses and dissipate kinetic energy. Suspension systems are also used on numerous other types of vehicles, including trains. These suspension systems have been the subject of a substantial amount of development during the past few decades.

For example, one type of suspension system well known in vehicle industries is often referred to as a "coil-over" shock absorber systems. These suspension systems typically employ a fluid-type shock absorber with a cylinder and a piston rod telescopically extending through one end of the cylinder. A coil spring has one end seated the cylinder, while the piston rod extends through the coil spring on a central axis thereof. The other end of the coil spring is seated or otherwise mounted to a vehicle frame or the like, with the far end of the piston rod also appropriately connected to vehicle suspension or frame components.

Although coil-over shock absorber systems are part of the vehicles original manufacture, it is often desired to modify vehicles so as to provide for air-over shock absorber systems. In place of the typical coil springs associated with OEM shock absorber systems, the air-over shock absorber systems utilize various types of air springs in combination with shock absorbers utilizing piston rod and cylinder configurations. In this regard, it is advantageous to provide vehicle owners with conversion assemblies, which include components required to convert coil-over to air-over suspension systems.

General concepts associated with suspension systems and conversions of the same are relatively well known in the arts. For example, Hellyer, et al., U.S. Pat. No. 5,180,144, issued Jan. 19, 1993 describes concepts associated with an air spring module constructed so as to be removably mounted between a damper and a vehicle body. This patent describes the concept that it has been known to employ automotive suspension struts in suspension systems constructed with either coil springs or air springs mounted coaxially about the strut. Problems can be encountered with front suspension struts mounted to the front steerable wheels. When the wheels are steered, the springs can undergo a twisting motion, as the strut body rotates with the wheel. The twisting will undesirably change the characteristics of the coil spring. To solve the problem of torsional twist of the coil springs, a bearing assembly can be placed between the vehicle body and a mounted piston rod of the strut, so as to allow the strut to rotate relative to the body. When incorporating an air suspension system on a strut assembly, such as a MacPherson strut assembly, it is desirable to allow for replacement of the strut without removal or disassembly of the air spring. For this to occur, the air spring needs to be detachable with respect to the strut body and the vehicle body. The Hellyer, et al. patent specifically discloses an air spring module removably mounted on a damper. The damper includes an outer reservoir tube closed at its upper end by a seal cover. A neck of the seal cover receives a reciprocal piston rod extending from the damper. The lower end of the damper is mounted to a wheel assembly in a conventional manner. The module includes a contact piston. The reservoir tube is received within a large diameter portion of the piston, and the piston rod fits in a small diameter portion of the piston.

An elastomeric air sleeve is attached to the outer circumference of the contact piston by a clamp or retainer. A rolling lobe is formed in the portion of the sleeve which travels along the contact piston. The upper portion of the sleeve is secured to a canister by a retainer. The canister is welded to a lower bearing retainer. An isolated bearing assembly is provided between the lower bearing retainer and an upper bearing retainer. An elastomeric mount having a cylindrical sleeve is fitted over a stepped portion of the piston rod. A metallic ring is provided about the mount, and is welded to the lower bearing retainer so as to secure the mount. A lower rate washer is secured to the sleeve at a lower surface of the mount. A plate is connected to the lower bearing container by a retainer ring received in a groove at the outer circumference of a neck portion of the lower bearing retainer. The plate can include a series of downwardly projecting preloaded rubber pads. The pads rest on a series of thrust washers. The thrust washers are mounted about the neck of the lower bearing retainer and held in place by a support secured to the bearing retainer.

With an air spring module having the structure described in the foregoing paragraphs, the module can be mounted to a number of different types of dampers, including hydraulic and pneumatic dampers. For purposes of assembling the module in a vehicle, the contact piston is fitted over the piston rod and the reservoir tube. O-ring seals are provided in a first groove within the neck of the seal cover, so as to provide a seal between the sleeve and the neck. A retainer ring is mounted in a second groove of the neck and is initially compressed as the sleeve is slid over the neck. A complimentary groove is provided in an inner surface of the sleeve, so that the retainer ring springs outwardly and fits snuggly into the groove when the contact piston is in its proper position. With this construction, a relatively quick and removable connection between the lower end of the module and the damper is provided.

Oishi, U.S. Pat. No. 6,332,602 issued Dec. 25, 2001 describes a vehicle suspension system having an annular air chamber. More specifically, Oishi describes the construction of an annular bellows unit for replacing a vehicle suspension coil spring. The coil spring encloses a shock absorber or "hydraulic actuator." Oishi describes what he considers to be problems associated with known suspension conversion arrangements, where pressurized bellows are substituted for coils. Oishi explains that the pressurized bellows of known systems are incompatible with the concentric mounting of shock absorbers. It is described that shock absorbers are known whereby they are configured for receiving pressurized air for selectively increased ride height, with the pressurized air augmenting conventional springs.

Further described are concepts associated with the use of hydraulic actuators, which are substituted for conventional shock absorbers. The actuators, also being operable for modifying ride height, may use (for example, in "low-rider" applications) a downwardly extending piston rod of a hydraulic actuator connected to a lower suspension A-arm in place of a conventional shock absorber. An oppositely extending cylinder body is connected through a cut-down portion of the original coil spring to the vehicle chassis. An electrically driven pump can feed the single-acting actuator, so as to change the ride height in response to operator input. Oishi states that a disadvantage associated with low-rider actuators known in the prior art is that they produce a particularly harsh ride, with substantially no spring action, because only about half of the original spring is utilized.

Oishi alleges that the vehicle suspension embodiment described in his patent meets the need for an adjustable vehicle suspension biasing element, compatible with concentric shock absorber mountings and otherwise overcoming other disadvantages of the prior art. More specifically, Oishi discloses what he characterizes as an after-market vehicle suspension biasing element. Specifically, an annular bellows apparatus for a vehicle suspension includes an outer bellows, inner bellows, upper flange member and lower flange member. Opposite ends of the outer bellows are sealed through clamping onto outer extremities of the upper and lower flange members by outer clamp rings. The outer bellows also includes generally cylindrical outer extensions formed at opposing ends for receiving the clamp rings.

In addition, the upper and lower flange members have their outer beads reinforced by outer bead rings, and an additional outer bend reinforcing ring. This reinforcing ring is located between adjacent ones of the outer bellows. The reinforcing rings serve so as to prevent outward expansion of bellows segments when the bellows apparatus is pressurized. The outer bellows described by Oishi is a known component utilized in air suspension devices manufactured by Goodyear Tire & Rubber Company.

Oishi further discloses an inner bellows having a generally smaller diameter than the outer bellows. The inner bellows is characterized as being configured so as to withstand outside air pressure, in contrast with the outer bellows which is configured to withstand inside air pressure. The inner bellows includes a series of segments, with inner extensions being formed at opposing ends so as to receive respective inner clamp rings. In this manner, the inner bellows is clamped to the upper and lower flange members of the suspension system.

With the inner and outer bellows, a sealed annular chamber is formed therebetween. Oishi describes that this annular chamber is formed while continuing to preserve the annular configuration of the entirety of the bellows apparatus. A fill port is provided in the lower flange member for purposes of pressurizing the chamber. Oishi describes the concept that the bellows apparatus can be combined with a generally concentric shock absorber, with the bellows apparatus and the shock absorber remaining concentric both when the apparatus is in an extended condition and a compressed condition.

The segments of the inner bellows are described as tapering inwardly at opposing ends, with oppositely facing elements integrally formed and joined at the outer peripheral extremities thereof. The inner bellow segments can be reinforced by outside reinforcing rings, encapsulated or otherwise connected so as to prevent contraction of outer peripheral extremities of the inner bellow segments.

Oishi also describes two alternative embodiments for the bellows apparatus, both consisting of alternative configurations for the inner bellows. In one embodiment, the inner bellows includes a series of inside reinforcing rings located and connected at inner peripheral extremities of adjacent inner bellow segments. This embodiment of the inner bellows includes an outwardly projecting bead flange joined to a counterpart of the inner extension. A counterpart of the inner bead ring is encapsulated within the bead flange. In another embodiment, an axially split counterpart of the upper flange member includes both an outer flange and an inner flange, with the flanges clamped on opposing sides of the bead flange by a series of clamp fasteners. A counterpart of the outer bellows is connected to the upper flange, which is formed with a shallow counterpart of a groove depression, so as to have the outer extension of the outer bellows clamped thereto. The extension is formed without the outer bead ring and outer reinforcing ring that is included in other bellows.

In summary, Oishi considers his patent to disclose a bellows apparatus for replacing a coil spring in a vehicle suspension having a shock absorber mounted generally concentrically with the previous location of the spring. Also, the bellows apparatus described in Oishi allegedly can be used with a low-rider hydraulic actuator, replacing an original spring that would otherwise have to be shortened. An appropriate ring member couples the bottom of the bellows apparatus to a cylinder body of the actuator, with the ring member resting on a shoulder that is formed by a lower enlargement of the cylinder body.

Okamoto, U.S. Pat. No. 6,398,198 issued Jun. 4, 2002 is directed to a bellows-type air spring with a vehicle height adjustable suspension arrangement utilizing the air spring. More specifically, a particular embodiment of a bellows-type air spring is utilized with specific structures of upper and lower mounting units, and with two additional alternative embodiments of the upper mounting units. In one embodiment, the height adjustable suspension includes an upper mounting unit mounted to a chassis of the vehicle, with a shock absorber mounted to the upper unit and a bellows body to the shock absorber.

The bellows body is characterized as a two-stage air spring, with a hollowed cylindrical shape and first and second open ends. First and second end members, each having a plate-like shape, are provided in the first and second open ends of the bellows body. The body defines diametrically large portions which are vertically aligned along a longitudinal axis thereof, and diametrically smaller portions located at the upper and lower open ends of the bellows body, and also between diametrically larger portions. Peripheral edges of the upper and lower open ends are outwardly bent so as to form engaging portions, with wire rings mounted therein. Also, a ring is mounted within one of the diametrically smaller portions positioned between the larger portions, so as to prevent the smaller portion from expanding radially outward.

First and second end members have peripheral edges bent radially inward, so as to form engaging portions which respectively engage with additional engaging portions, allowing the first and second end members to seal the upper and lower open ends of the bellows body. The first end member includes a central portion defining a through hole, with four inwardly threaded portions having their axes extending parallel to the longitudinal axis of the bellows body and arranged along a concentric circle of the through hole. An air valve mounting portion is arranged concentric of the through hole, so as to introduce and discharge air into and from the bellows body, respectively.

The second end member has a central portion defining a further through hole with a diameter smaller than the first through hole of the first end member. The second end member is provided with a pair of outwardly threaded portions having their axes extending parallel to the longitudinal axis of the bellows body. The outwardly threaded portions are oppositely positioned with the through hold therebetween. The shock absorber is conventional in nature, and includes a body extending through the through hole of the first end member. The retractable rod of the shock absorber extends through the through hole of the second end member. The body of the shock absorber is received by a spring receiving member disposed under the first member. The spring receiving member includes a hollowed cylindrical portion for receiving the body, and a flange portion integrally formed with a base portion of the hollowed cylindrical portion. The cylindrical portion of the spring receiving member includes a lower end portion secured to the shock absorber body by welds. The flange portion of the spring receiving member defines concave portions, for receiving bolts adapted to be threadably engaged with inwardly threaded portions of the first end member. O-rings are provided around the bolts within the concave portions, for prevention of air leakage from the bellows body. The flange portion of the spring receiving member includes an upper surface facing the first end member, defining an annular concave portion for receiving another O-ring, surrounding the respective inwardly threaded portions.

The flange portion of the spring receiving member also defines an annular inclined surface, so as to form a reservoir for receiving liquid silicone to prevent air leakage from the bellows body. The bellows body is thus subjected to an air leak prevention measurement through not only the O-rings, but also the liquid silicone.

Turning to the upper portion of the shock absorber, the retractable rod extends through a dish-like adapter, and above the upper end of the second end member. The adapter includes a plate-like bottom wall, with an annular side wall integrally formed with a peripheral edge of the bottom wall. The bottom wall has a central portion defining a through hole for receiving the retractable rod, and an annular concave portion in communication with a lower portion of the through hole for receiving an O-ring surrounding the retractable rod. In this manner, the bellows body is subjected to a secured air leakage prevention measurement by means of the O-ring resting on the annular concave portion. The bottom wall of the adapter defines through holes for receiving outwardly threaded portions, which are threadably engaged with nuts, thus securing the adapter to the second end member. The side wall includes a circumferential periphery, defining therein an annular concave portion.

The upper mount unit includes what Okamoto characterizes as a "holding means" comprising an annular member made of metal for receiving an outwardly threaded portion formed on the upper end of the shock absorber rod. Also included is a rod holding member with an annular damper rubber provided around the annular member. An annular fixing plate is secured to the circumferential periphery of the rod holding member, and a dish-like receiving plate secured to the circumferential periphery of the rod holding member below the annular fixing plate.

The fixing plate is provided with stud bolts, extending through through holes of the chassis of the vehicle. The stud bolts are threadably engaged with nuts, thus mounting the upper mount unit to the chassis. The outwardly threaded portion of the retractable rod extends through a washer and the annular member of the upper mount unit. This threaded portion has a portion protruding from the second end member, to which a nut is threadably engaged, thus mounting the shock absorber to the upper mount unit. Between the annular concave portion and the receiving plate is a bearing, which allows the adapter to be rotatably supported on the upper mount unit.

With respect to assembly, the spring receiving members first welded onto the body of the shock absorber. The liquid silicone is then poured into the reservoir defined by the annular inclined surface. The first end member positioned on the lower upper end of the bellows body is then mounted to the spring receiving member by allowing the shock absorber body to extend through the through hole of the first end member. Bolts are threadably engaged with the inwardly threaded portions of the first end member through the concave portions. The tightening force of the bolts will squeeze the O-ring pair, thereby achieving a hermetic sealing of the lower open end of the bellows body.

The second end member positioned in the upper open end of the bellows body is then mounted to the adapter by allowing the outwardly threaded portions to extend through the through holes of the adapter. Nuts are threadably engaged with the outwardly threaded portions. The tightening force of these nuts will squeeze the O-ring associated with the second end member, thereby achieving a hermetic sealing of the upper open end of the bellows body.

The outwardly threaded portion of the retractable rod of the shock absorber will extend through the annular member of the upper mount unit, and is engaged with a nut. The upper mount unit is thus mounted to the shock absorber. When the assembled suspension is mounted to the chassis, stud bolts are inserted into through holes within the chassis, and are tightened with nuts. In some instances, the upper mount unit may be pre-mounted to the chassis. In this case, the upper mount unit is omitted from the vehicle height adjustable suspension assembly. The retractable rod of the shock absorber then has the outwardly threaded portion of the same extending through the annular member of the rod holding member, and is threadably engaged with the nuts. Okamoto further discloses the concept that an air feeding system for feeding (and discharging) air into the bellows body may include an air tank, compressor and switching apparatus controllable by a driver in the driver compartment. Okamoto also discloses alternative embodiments associated with the configuration of the upper mount unit.

Morrow, U.S. Pat. No. 6,382,602 issued May 7, 2002, is directed to a method for retrofitting height and load adjustable air springs to coil spring-based Mac Pherson strut assemblies. The method includes removal of the coil spring and removing material from an outer surface of a bump stop seat, so that the outside diameter of the stop seat is slightly less than the outer diameter of the strut housing. This allows a lower air spring mount to readily slide down the strut housing during retrofitting. The lower spring seat is then removed from the strut housing, and the lower air spring mount is slide down the strut housing. The mount includes pre-installed O-rings in machined grooves within the lower air spring mount. The mount is seated on an existing weld, with the weld being previously used to attach the original coil spring seat to the strut housing.

The lower air spring mount is then rotated and correctly positioned about the strut housing, so that an air fitting bore is located perpendicular to a lower hub mounting clevis, and located free of obstructions. A fillate of silicone is then applied around the upper location where the strut housing passes through the lower air spring mount. The fillate acts in conjunction with the O-rings so as to seal the lower spring air spring mount to the strut housing in an air tight configuration.

An air spring is then positioned around the strut piston rod and the strut housing. The air spring includes one chamber having a flexible rubber membrane arranged in single, double or triple bellows orientation. The air spring includes upper and lower portions. A lower bead ceiling ring is provided between the lower portion of the air spring and a top portion of the lower air spring mount. The lower portion of the air spring is then secured to the lower air spring mount through the use of Allen head cap screws and nuts. An upper air spring mount is then slid down the strut piston rod, until the mount rests on the top of the upper portion of the air spring. The upper air spring mount includes pre-installed O-rings and machined grooves therein. The O-rings are used to seal the upper air spring mount to the strut piston rod in an air tight fashion.

An upper spring bead ceiling ring is provided between the upper portion of the air spring and a bottom portion of the upper air spring mount. The upper portion of the air spring is secured to the upper air spring mount through the use of Allen cap screws and nuts, so as to ensure an air tight seal between the upper portion of the air spring and the upper air spring mount. In this manner, a retrofit arrangement is provided.

Voelkel, U.S. Pat. No. 6,581,9189 issued Jun. 24, 2003, discloses a shock absorber having a hollow spring with a chamber comprising a proximal end, a distal end and a bellows composed of a springy material connecting the two ends and enclosing the chamber. A shock absorber cylinder extends through and is attached to the hollow spring proximal end, with the piston extending through and slidably engaging the hollow spring distal end. The piston is characterized as having a "contacting" device located distally of the hollow spring distal end for urging the distal end proximally when the contacting device is forced against the hollow spring distal end. The device urges the piston distally when the hollow spring distal end is forced against the contacting device. Voelkel also discloses the concept of powered control of application and discharge of air to and from the air spring chamber.

LaPlante, et al, U.S. Pat. No. 6,904,344, issued Jun. 7, 2005, is directed to semi-active control methodology for a shock absorber control system. The system is disclosed as being adapted for a coil spring and real-time adjustable shock absorber system. LaPlante et al discloses methodology directed to processing so as to account for non-inertial spring/mass system responses, and multi-dimensional forces acting upon the system. The methodology also includes processing in the form of an acceleration hedge calculation, so as to accurately define system operation at travel extremes. In summary, the methodology is directed to concepts associated with producing a series of valve control signals, selecting among these control signals, and applying a selected control signal to an appropriate valve in a closed-loop feedback system. In this manner, energy is adjusted within the spring/mass system.

In one embodiment, La Plante et al discloses the spring/mass system as comprising at least two masses, with a spring coupled between the masses and with a controllable damper. The purpose of the shock absorber controller is to generate a target control signal, so as to adjust the energy in the spring/mass system. A series of input circuits is configured so as to receive input signals representing parameters selected from a group consisting of a relative position of the masses, relative mass velocities, mass accelerations, a spring constant for the spring/mass system, a mass of at least one of the masses, a critically damped coefficient of the spring/mass system, and an upper force threshold for a critically damped force in the spring/mass system. An "endstop" position for the spring/mass system is also determined. Processing configurations are utilized so as to determine if the spring/mass system is compressing or expanding, based on at least the relative velocity of the masses with respect to one another. Second and third processors are configured so as to generate control signals to control the damper in response to at least one of the input signals. A fourth processor is configured so as to select one of the control signals based on the spring/mass system compressing or expanding, and based on a comparison of the control signals. The fourth processor configured to generate the target control signal based on the selected signal, with the target signal being proportional to a desired energy in the spring/mass system.

A relatively early but substantial advance in the vehicle suspension system arts is represented by Pemberton, U.S. Pat. No. 3,727,899, issued Apr. 17, 1973. Pemberton discloses a spring suspension unit adapted to extend between a vehicle frame and suspension members. The unit includes a coil spring extending between the members, with an inflatable elastomeric bag disposed within the coil spring. The bag is expandable so as to dispose side wall portions of the bag between the convolutions of the spring. The bag is disclosed as being formed of cup-shaped portions, having end and side walls. The cup-shaped portions also have radially outwardly projecting flanges at their open ends. The flanges are heat-sealed in an abutting air-sealed relationship, and provide a radially projecting convolution engaging ring. Means are also provided which lead from the bag's exterior and to one of the portions of the bag, so as to introduce pressurized air.

Turning to the more specific issues related to the present invention, air suspension systems have seen rapid growth in OEM and aftermarket industries. High volume OEM applications are engineered to fit a particular vehicle application, with minimal variations. Low-volume aftermarket systems must be more flexible, so as to allow multi-vehicle fitment and multiple system variations. Traditionally, each variation is engineered separately, with engineered components specific to each variation. However, if air suspension system variations with key components could be constructed so as to be used flexibly, a modular system could be proposed. Common key components would reduce system variation engineering time, and provide for greater volumes per year, while reducing component and system costs.

With respect to the foregoing, the vehicle industries have certain types of unique needs. For control systems for controlling of various types of vehicle systems, customers desire a simple and relatively small interface. Customers also desire a simple installation, with expansion capabilities as the customers invest additional monies into their vehicles. Correspondingly, suppliers wish to use common components for multiple systems, so as to keep costs reduced, but still offer a number of product variations. Also, suppliers wish to offer expansion capabilities, so as to sell additional product.

SUMMARY OF THE INVENTION

In accordance with the invention, a modular control system is adapted for use in a vehicle. The control system may be used for adjustment of air suspension systems, with the control system having driver interface means adapted to be visually accessible to a driver of the vehicle. The interface means are responsive to actions initiated by the driver so as to transmit interface control signals indicative of selectable states of operation of the air suspension systems, as desired by the driver. Air suspension control means are communicatively coupled to the driver interface means and are responsive to transmission of the interface control signals so as to selectably control air pressure and/or height of at least one of the air suspension systems.

With respect to one concept of the invention, the modular control system operates in a wired mode. The system includes first wire means connected between the driver interface means and the air suspension control means. The interface control signals are communicatively transmitted to the air suspension control means on the first wire means. Further, the air suspension control means are communicatively coupled to the driver interface means through the first wire means, and are responsive to the interface control signals on the first wire means for selectively controlling air pressure of at least one of the air suspension systems. Further, the air suspension control means are responsive to the interface control signals on the first wire means for selectively controlling height to at least one of the air suspension systems.

In accordance with the further aspect of the invention, the system can operate in a wireless mode. The driver interface means can include first spatial transmission means for transmitting interface control signals as spatially transmitted signals. The air suspension control means includes first reception means for receiving the spatially transmitted interface control signals. The air suspension control means can also be responsive to the interface control signals so as to selectably control air pressure of at least one of the air suspension systems. Further, the air suspension control means can be responsive to the interface control signals to selectably control height of at least one of the air suspension systems.

The driver interface means includes a single driver interface unit which is selectably positionable within a cab of the vehicle, so as to be visually accessible to the driver. The air suspension control means includes a plurality of separate and modular air control units. The single driver interface unit controls operation of all of the control units.

The control system also includes additional control means communicatively coupled to the driver interface means. The additional control means are responsive to second interface control signals transmitted by the driver interface means for selectably controlling operations of the vehicle consisting of one or more of the following: damper operation; engine operation. Driver interface means can include a single driver interface unit, while the air suspension control means can include at least one air control unit. The driver interface unit and the air control unit are configured so as to provide for control of one, two and four point configurations of the air suspension systems.

The air control means includes an air control unit printed circuit board configured and designed so as to allow flexible mounting of a first combination of elements having a radio and batteries or, alternatively, a second combination of elements having control or area network card and flying leads connectable to wire means connecting the air control unit to the driver interface unit. Further, the system includes an open architecture system, in that the first wire means is capable of addition so as to selectively, mechanically and electrically interconnect additional driver interface units and/or additional control units within the modular control system.

BRIEF DESCRIPTION OF THE SEVERAL VIEWS OF THE DRAWING

The invention will now be described with reference to the drawings, in which:

FIG. 1 is a prior art coil-over shock absorber assembly adapted for use with a vehicle suspension system;

FIG. 2 is a sectional, elevation view of a first embodiment of an air-over shock absorber system, and comprising a sleeve and a shock absorber, where the shock absorber may correspond to the shock absorber of the prior art system illustrated in FIG. 1;

FIG. 27 is a schematic showing a single point air control unit;

FIG. 28 is a schematic illustrating a dual point air control unit;

FIG. 29 is a schematic illustrating a four point control unit;

FIG. 30 is a schematic illustrating a dual point control unit with the utilization of a motorized air compressor, instead of an air tank;

FIG. 31 is a schematic showing a dual point control unit utilizing three solenoids;

FIG. 32 is a schematic similar to FIG. 31, but showing the use of an air tank;

DETAILED DESCRIPTION OF THE INVENTION

Figure 4:
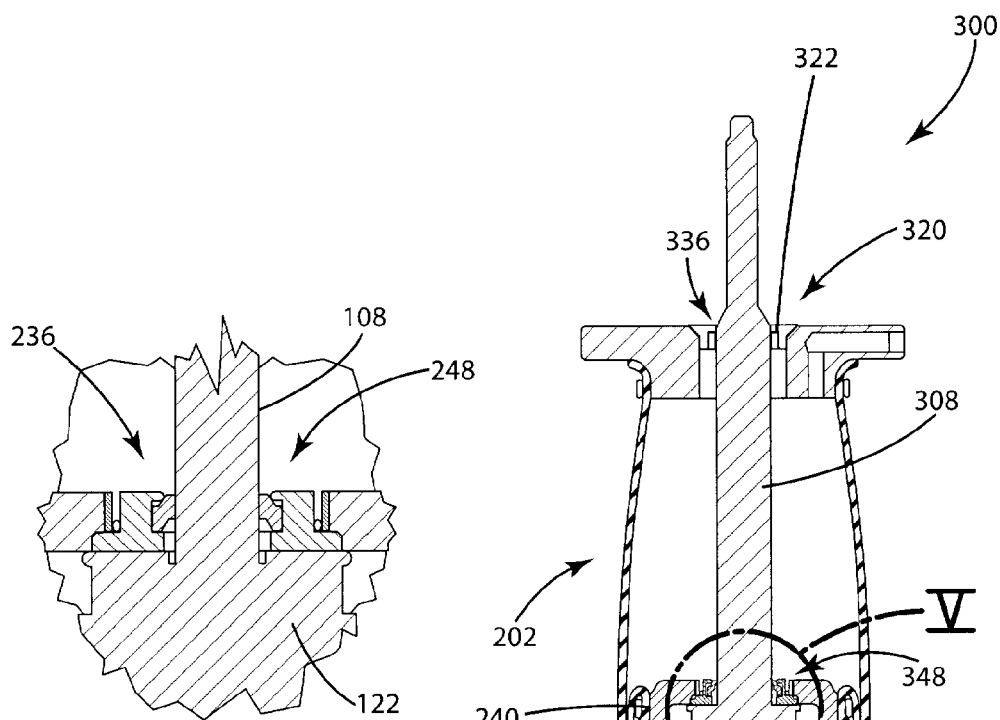
FIG. 4 is an enlarged, sectional and elevation view of a lower seal assembly utilized with the shock absorber system shown in FIG. 2, taken within circle A of FIG. 2.
Figure 5:
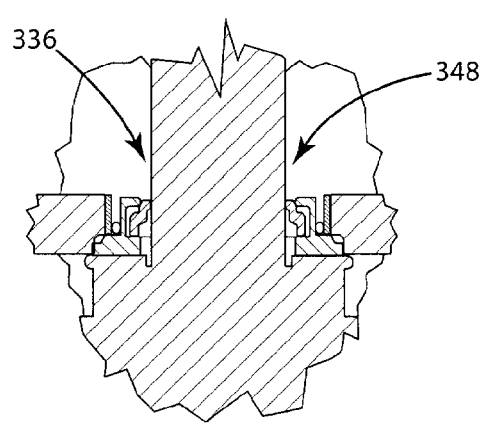
FIG. 5 is an enlarged, sectional and elevation view similar to FIG. 4, but showing the lower seal assembly utilized in the air-over shock absorber system illustrated in FIG. 3, and taken within circle B.

The principles of the invention are disclosed, by way of example, in modular control systems comprising wireless and wired configurations, as illustrated in FIGS. 16-33. For purposes of background description, a coil-over shock absorber system 100 and air-over shock absorber systems 200, 300 and 400 will first be disclosed herein, and are illustrated in FIGS. 1-15. Following this description, control systems in accordance with the invention will be described, with reference to the illustrations of FIGS. 16-29. As will be made apparent from the description in subsequent paragraphs herein, certain shock absorber systems facilitate the replacement of a coil spring with an air spring (meaning a spring which may be filled with either gaseous or fluid materials), and sealing the internal chambers of the air spring only on the piston of the shock absorber. Further, for facilitating inventory flexibility and variations in piston rod diameters, shock absorber systems may include modular seal assemblies using end caps common in configuration across variously sized piston rods. Still further, and as also made apparent from subsequent description herein, shock absorber systems may employ rate adjustable pistons (commonly referred to as "spring pistons"), with a threaded damper body as employed with a coil-over shock absorber system. With this use, the rate adjustable piston can be threadably adjusted in a longitudinal manner along the damper body, so as to adjust the spring rate desired for any given application of the replacement air-over shock absorber system.

For purposes of clarity and completeness of disclosure, a prior art coil-over shock absorber system 100 will first be described. This system 100 is illustrated in a side view in FIG. 1. More specifically, and with respect to FIG. 1, the coil-over shock absorber system 100 includes a conventional shock absorber 102, with a coil spring 104 mounted in a coaxial relationship to the shock absorber 102. The coil spring 104 is shown only in part in FIG. 1, without illustration of an upper portion of the spring 104. The upper portion of the coil spring 104 may forcibly abut a vehicle member (not shown) associated with the vehicle frame or suspension system. For example, such a member may be associated with a chassis frame bracket. Such a bracket, for example, may have a dependent and downwardly extending member (not shown) for receiving an upper end convolution (not shown) of the coil spring 104.

Turning to the shock absorber 102, and with further reference to FIG. 1, the shock absorber 102 includes a cylinder 106 and a piston rod 108 extending upwardly therefrom. An upper end 110 of the cylinder 106 extends into the lower end 112 of the coil spring 104. Received coaxially around the body of the cylinder 106 is a spring seat 114. The spring seat 114 provides for a stationary abutment for a reduced diameter lower end convolution 116 of the coil spring 104. The cylinder 106 includes a lower end 118. Connected to the lower end 118 and extending downwardly therefrom is a conventional clevis 120. The clevis 120 may be utilized to secure the lower portion of the coil-over shock absorber system 100 to an appropriate member of the vehicle chassis or axle system.

The piston rod 108 of the shock absorber 102 includes a lower end which slides into and out of the cylinder 106. The cylinder 106 can include a bushing or similar device (not shown) that slidably engages the piston rod 108 to allow movement of the piston rod 108 into and out of the cylinder 106. Further, the piston rod 108 can include end rings or similar devices (not shown) which will slidably engage an inner chamber 122 (shown in FIG. 2) of the cylinder 106, and may be utilized to prevent the end of the piston rod 108 from completely sliding through the bushing (not shown) and out of the cylinder 106. The cylinder inner chamber 122 may be filled with a "resistance" material (not shown). Such material may include oil or similar fluids for providing a damping resistance within the inner chamber 122 to movement of the piston rod 108 therein. Although not shown in FIG. 1, the cylinder 106 may also include adjustment components for purposes of adjusting the pressure of the resistance material within the inner chamber 122. In this manner, damping resistance to movement of the piston rod 108 may be selectively modified.

As earlier stated, the piston rod 108 extends outwardly through the upper end 110 of the cylinder 106. A piston end mounting 124 is positioned on a terminating end 126 of the piston rod 108. The piston end mounting 124 would be appropriately connected to the vehicle chassis or other components of the vehicle suspension system through known mounting assemblies.

Figure 7:
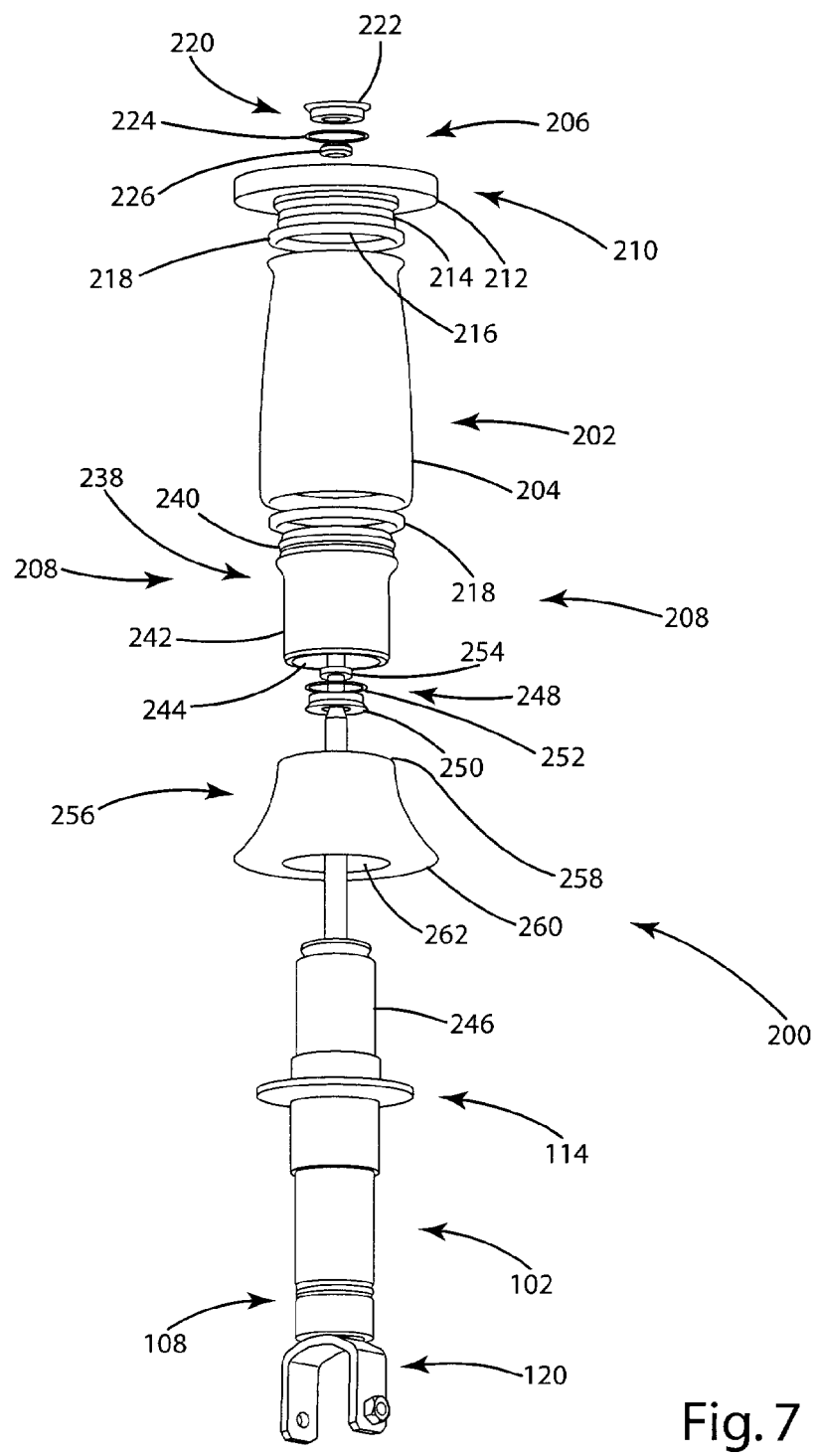
FIG. 7 is a perspective and exploded view of the air-over shock absorber system illustrated in FIG. 2.
Figures 8, 9:
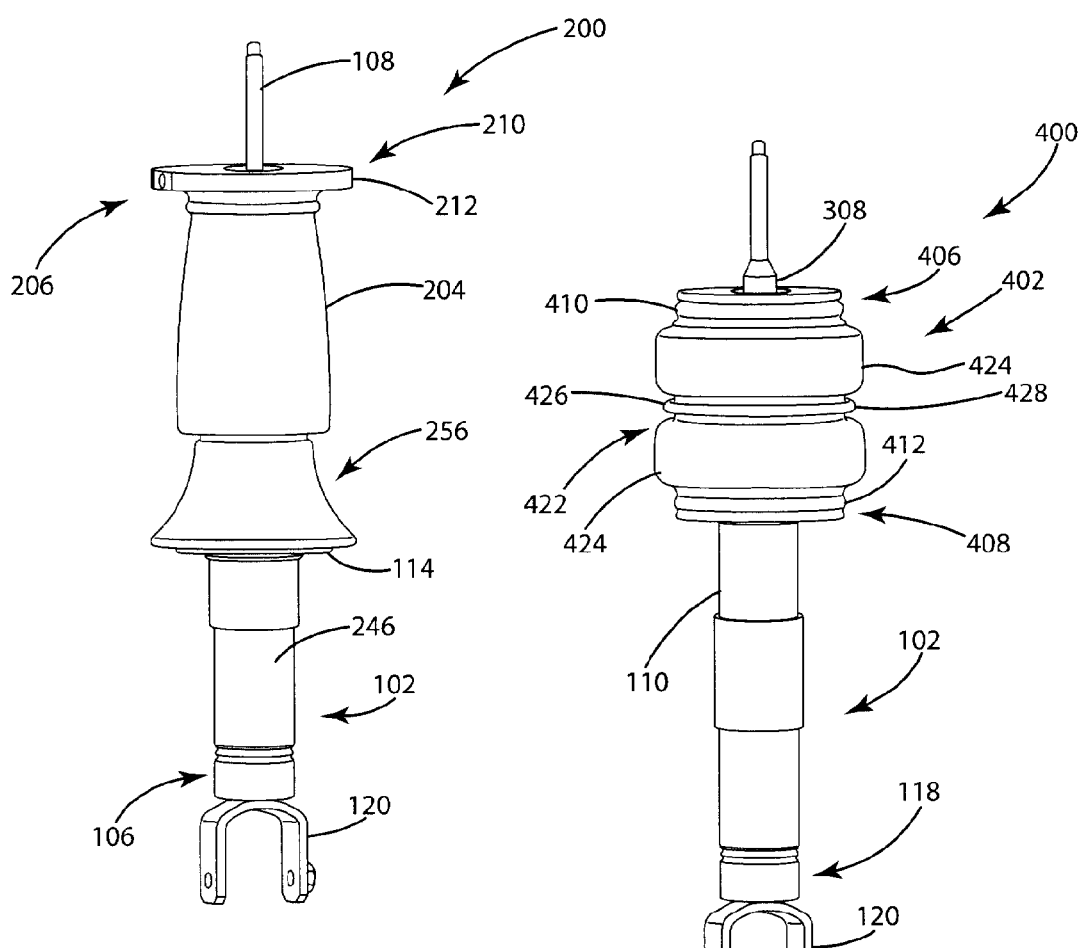
FIG. 8 is a perspective view of the air-over shock absorber system illustrated in FIG. 7, but showing the system in a fully assembled state.
FIG. 9 is a perspective view of the third embodiment of the coil-over shock absorber system, and illustrated in sectional format in FIG. 6.

The coil-over shock absorber system 100 can be converted to an air-over shock absorber system 200 as illustrated in FIG. 2 and FIG. 7. The air-over shock absorber system 200 includes substantially the same shock absorber as employed with the coil-over shock absorber system 100. That is, in the system 200, the shock absorber 102 is utilized, having a cylinder 106 and piston rod 108. The cylinder 106 includes the inner chamber 122, with the lower end 118 of the cylinder 106 attached to the clevis 120. The piston rod 108 still includes a terminating end 126, and the piston rod 108 and clevis 120 would be attached to appropriate members of the vehicle chassis or other components of the vehicle suspension system (not shown).

In contrast, however, to the shock absorber system 100, the shock absorber system 200 does not include the coil spring 104 or any other type of helical or metallic spring. Instead, the air-over shock absorber system 200 employs a sleeve assembly 202, in substitution for the coil spring 104. The sleeve assembly 202 can be characterized as comprising a flexible member or elongated sleeve 204. The flexible member 204 can be manufactured from various materials, with the materials providing for substantial strength, without requiring relatively large thicknesses. The sleeve or flexible member 204 may, for example, be molded of a material such as natural rubber or neoprene.

Positioned at the upper portion of the flexible member 204 is an upper end assembly 206, as primarily shown in FIGS. 2 and 7. As described in subsequent paragraphs herein, the upper end assembly 206, in accordance with the invention, is utilized to provide for an upper cap and seal assembly, for purposes of sealing off the upper end of the flexible member 204 and securing the upper end of the flexible member 204 to the piston rod 208. Correspondingly, the air-over shock absorber system 200 includes a lower end assembly 208. The lower end assembly 208 is positioned at the lower end of the flexible member 204, and is utilized to provide a lower end cap and seal with the lower end of the piston rod 108. As will be described in subsequent paragraphs herein, the sleeve assembly 202 provides for an air spring which seals only on the piston rod 108. It is believed that known systems employing air springs seal in only one place on associated piston rods.

Turning to the upper end assembly 206, and with reference primarily to FIG. 7 (along with FIG. 1), the upper end assembly 206 includes an upper end cap 210 having an annular configuration. The upper end cap 210 includes an upper portion 212 having a first diameter and a lower, integral portion 214 having a second diameter relatively smaller than the first diameter of the upper portion 212. An aperture 216 extends concentrically through the upper and lower portions 212, 214, respectively, of the upper end cap 210. The upper end assembly 206 further includes a circular crimp ring 218. The circular crimp ring 218 is adapted to fit around the outer periphery of the upper end of the flexible member 204, when the upper end assembly 206 is secured to the upper portion of the flexible member 204.

The upper end assembly 206 further includes what is characterized as a universal seal assembly or universal puck assembly 220. The universal puck assembly is utilized to provide seals of end caps at upper and lower ends of the flexible member 204. It will be made apparent, from subsequent description herein, that the universal puck assembly 220 utilized with the upper end assembly 206 is identical to a universal puck assembly subsequently described herein and used with the lower end assembly 208. The universal puck assembly 220 is illustrated in detail in FIGS. 10, 11 and 12. From the drawings, it is apparent that the piston rod 108 illustrated in FIG. 2 is shown with a relatively smaller diameter than piston rods associated with the shock absorber systems 300 and 400 illustrated in FIGS. 3 and 6, respectively.

Figure 10:
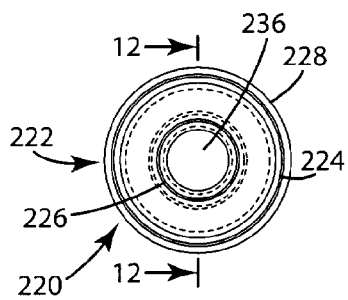
FIG. 10 is a plan view of one of the puck assemblies, which may be utilized with the air-over shock absorber system illustrated in FIG. 2.
Figure 11:
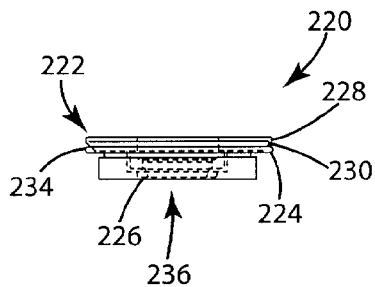
FIG. 11 is a side, elevation view of the puck assembly shown in FIG. 10.
Figure 12:
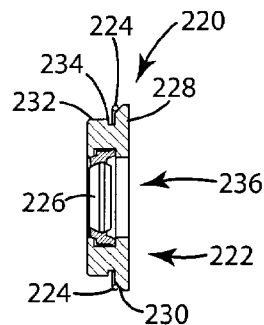
FIG. 12 is a sectional, side view of the puck assembly shown in FIG. 10, taken along section lines 12-12 of FIG. 10.
Figure 13:
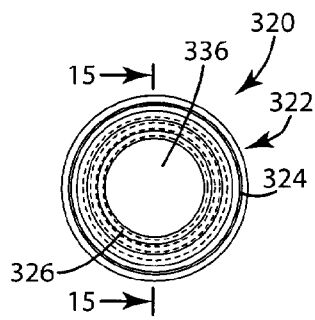
FIG. 13 is a plan view of a further one of the puck assemblies, similar to the puck assembly shown in FIG. 10, but adapted for use with the air-over shock absorber system shown in FIG. 3, having a piston rod of relatively larger diameter.
Figure 14:
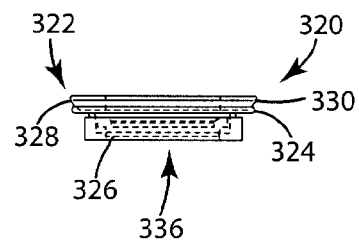
FIG. 14 is a side, elevation view of the puck assembly shown in FIG. 13.
Figure 15:
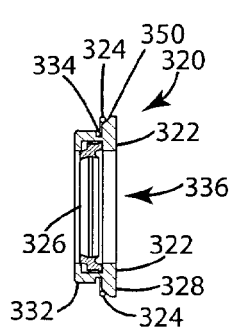
FIG. 15 is a sectional, side view of the puck assembly shown in FIG. 13, taken along section lines 15-15 of FIG. 13.

Turning primarily to FIGS. 7, 10, 11 and 12, the universal puck assembly 220 includes a universal puck 222. The universal puck 222 illustrated in FIGS. 10, 11 and 12 is adapted for use with the air-over shock absorber system 200 illustrated in FIG. 2, with the diameter of piston rod 108 being relatively smaller than the piston rods associated with the shock absorber systems 300 and 400 illustrated in FIGS. 3 and 6, respectively. As an example, one typical diameter of piston rods utilized in shock absorber systems is 14 mm. Accordingly, for purposes of description, the air-over shock absorber system 200 will be assumed to have a piston rod 108 with a diameter of 14 mm.

The universal puck assembly 220 includes three components, namely a universal puck 222, O-ring 224 and lip seal 226. For purposes of description, and so as to correspond to the assumed diameter of piston rod 108 as being 14 mm, the universal puck 222 will be referred to herein as the 14 mm puck 222. With reference primarily to FIGS. 10, 11 and 12, the universal puck 222 includes an upper annular portion 228 having an aperture 236 extending centrally therethrough. The upper annular portion 228 extends downwardly with an edge or face 230 which can be characterized as a common face or radial O-ring seal. The annular portion 228 is integral with a lower annular portion 232 having a diameter relatively smaller than the diameter of the upper annular portion 228. Between the upper annular portion 228 and lower annular portion 232 is a notch 234 extending completely around the outer periphery of the 14 mm puck 222. The aperture 236 extends not only through the upper annular 228, but also centrally through the lower annular portion 232. The diameter of the aperture 236 substantially corresponds to the diameter of the piston rod 108, namely 14 mm.

The lower end assembly 208 will now be described, primarily with respect to FIGS. 2, 7 and 10-12. With reference to these drawings, the lower end assembly 208 includes a lower end cap 238. The lower end cap 238 has a cylindrical configuration as primarily shown in FIG. 7, and includes an upper toothed portion 240 and a lower cylindrical portion 242. The upper toothed portion 240 can be characterized as an "interface" between the flexible member 204 and the lower end assembly 208. This portion 240 may include a series of four or more teeth extending around the circumference of the upper portion 240, with the teeth acting to seal and retain the flexible member 204 at its lower portion. The lower cylindrical portion 242 and upper toothed portion 240 include a central aperture 244. The central aperture 244 is adapted to receive the portion of the cylinder 106 which is identified as cylinder portion 246 in FIGS. 2 and 7.

The lower end assembly 208 further includes a second crimp ring 218. The second crimp ring 218, as shown in FIGS. 2 and 7, is adapted to fit around the lower end of the flexible member 204.

The lower end assembly 208 includes a second universal puck assembly 248, as primarily illustrated in FIG. 7. The universal puck assembly 248 is identical to the universal puck assembly 220 previously described herein and associated with the upper end assembly 206. Although identical, the universal puck assembly 248 and components associated therewith are being given numerical references differing from the universal puck assembly 220 and its associated components, for purposes of clarity and description. More specifically, the second universal puck assembly 248 is utilized to provide a seal of the lower end cap 238 with the piston rod 108 at the lower end of the flexible member 204. The individual components of the universal puck assembly 248 correspond to the components of the universal puck assembly 220 illustrated in FIGS. 10, 11, and 12. That is, the universal puck assembly 248 includes three components. Specifically, these components include a universal puck 250, O-ring 252, and lip seal 254. The universal puck 250 is identical to the previously described universal puck 222, while the O-ring 252 is identical to the previously described O-ring 224. Correspondingly, the lip seal 254 is identical to the previously described lip seal 226. Accordingly, and with reference to FIG. 7, the universal puck 250 includes an angular portion 228 having an aperture 236 extending centrally therethrough. The angular portion 228 has an outer common face or radial O-ring seal 230. The angular portion 228 is integral with a second angular portion 232 having a diameter relatively smaller than the diameter of the angular portion 228. Between the angular portion 228 and angular portion 232 is a notch 234 extending completely around the outer periphery of the 14 mm puck 250. The aperture 238 extends not only through the first angular portion 228, but also centrally through the second angular portion 232. The diameter of the aperture 236 substantially corresponds to the diameter of the piston rod 108, namely 14 mm.

In addition to the foregoing components, the air-over shock absorber system 200 includes a component which may be characterized as a rate adjustable piston 256. The rate adjustable piston 256 has what may be characterized as somewhat of a frustrum shaped configuration with an upper end 258, lower end 260 and aperture 262 extending centrally through the rate adjustable piston 256. The aperture 262 is sized so as to securely fit around the outer periphery of the lower cylindrical portion 242 of the lower end cap 238. The rate adjustable piston 256 is appropriately threaded so that the piston 256 can be moved longitudinally along the cylinder 106 of the shock absorber 102. By adjusting the longitudinal position of the rate adjustable piston 256 along the cylinder 106, the "air spring rate" can be adjusted on a per application basis.

The assembly of the air-over shock absorber system 200 will now be described, primarily with respect to FIGS. 2, 7, and 10-12. The coil spring 104 is first removed from the coil-over shock absorber system 100 illustrated in FIG. 1. The rate adjustable piston 256 is then mounted to the shock absorber 102 and received onto the cylinder portion 246, with the piston rod 108 extending therethrough. The rate adjustable piston 256 is lowered to the spring seat 114. The lower end cap 238 is then received on the piston rod 108, with the lower cylindrical portion 242 being received within the interior aperture 262 of the rate adjustable piston 256. The upper toothed portion 240 of the lower end cap 238 is then received through the lower end of the flexible member 204. The crimp ring 218 is then used to secure the upper toothed portion 240 to the lower end of the flexible member 204. This configuration is primarily shown in FIG. 2.

The second universal puck assembly 248 can then be mounted to the upper end of the lower end cap 238 and utilized to provide a seal around the piston rod 108. More specifically, the universal puck 250 will be received within the upper aperture of the upper toothed portion 240 of the lower end cap 238. The universal puck 250 includes a notch corresponding to the notch 234 illustrated in FIG. 12 for the first universal puck assembly 220. The O-ring 252 is secured adjacent to the notch 234 in the same manner as shown for the first universal puck assembly 220. The positioning of the O-ring 252 provides for a seal around the periphery of the upper aperture of the lower end cap 238. The lip seal 254 (which corresponds to the lip seal 226 of the first universal puck assembly 220) is secured within a central aperture of the universal puck 250 and is sized so as to provide a snug fit around the periphery of the piston rod 108 which extends therethrough. In accordance with the foregoing, the second universal puck assembly 248 provides for a lower seal of the air spring assembly 202 on the piston rod 108.

Turning to the upper portion of the air spring assembly 202, the upper end assembly 206 includes the upper end cap 210. The upper end cap 210 is received within the upper end of the flexible member 204 in a manner so that the lower integral portion 214 is received within the upper opening of the flexible member 204. The crimp ring 218 is received around the periphery of the upper end of the flexible member 204 and is utilized to secure the flexible member 204 to the upper end cap 210. The piston rod 108 can be extended through the upper end cap 210, and the first universal puck assembly 220 can be received within the aperture 216 extending through the upper portion 212 of the upper end cap 210, and further received around the piston rod 108. More specifically, the universal puck 222 is mounted on to the piston rod 108 with the O-ring 224 and lip seal 226 appropriately positioned in the universal puck 222. When the first universal puck assembly 220 is appropriately secured within the aperture 216 of the upper portion 212 of end cap 210, the piston rod 108 extending through the puck assembly 220 is provided with a secure and tight seal with the upper end cap 210. Accordingly, the top portion of the air spring assembly 202 is sealed on the piston rod 108. The foregoing assembly provides for the air spring assembly 202 to be sealed only on the piston rod 108, with seals provided by the universal puck assemblies 220, 248 on the top and bottom portions, respectively, of the air spring assembly 202.

As earlier mentioned, the configurations of the upper end assembly 206 and lower end assembly 208, with the use of the first and second universal puck assemblies 220, 248, respectively, provide for sealing of the air spring assembly 202 only on the piston rod 108, and do not attempt to seal the air spring assembly on the shock absorber chamber or other components. This sealing configuration simplifies retrofitting to multiple damper types (or manufacturers), with common rod diameters. Still further, common damper rod seals are not designed to be exposed to high pressure external air. Advantageously, sealing to the rod on the bottom eliminates the problem of this high pressure air bypassing the rod seal and "over-pressuring" the damper. Further, the rate adjustable piston 256 can be threadably secured to the conventional coil-over piston chamber or cylinder 106. In this manner, rotation of the rate adjustable piston 256 will cause the piston 256 to longitudinally travel along the cylinder 106. As apparent from the drawings (particularly FIGS. 2 and 7), the outer lateral surfaces of the piston 256 vary in slope along the length of the piston 256. The positioning of the rate adjustable piston 256 relative to the flexible member 204 (in what may be characterized as a stationary or "neutral" position for the flexible member 204) results in a particular air spring "rate." With respect to operation of the rate adjustable piston 256, the piston 256 can be threaded upwardly, so as to increase the spring rate at a particular damper height. To reduce the spring rate, the piston 256 can be threaded downwardly. Still further, it should again be noted that the components utilized to seal the air spring assembly 202 with the piston rod 108 comprise the universal pucks 222 and 250. Also, as earlier described, these universal pucks 222, 250 are identical. With the universal pucks 222, 250 and the configurations of the upper end assembly 206 and lower end assembly 208, only relatively minor modifications need to be made to certain components of the air-over shock absorber system 200 for purposes of accommodating piston rods of diameters differing from the diameter of piston rod 108. As earlier described, the piston rod 108 can be characterized as a 14 mm piston rod. Another size piston rod which is utilized in the automotive suspension industries is a piston rod of 22 mm.

Figure 3:
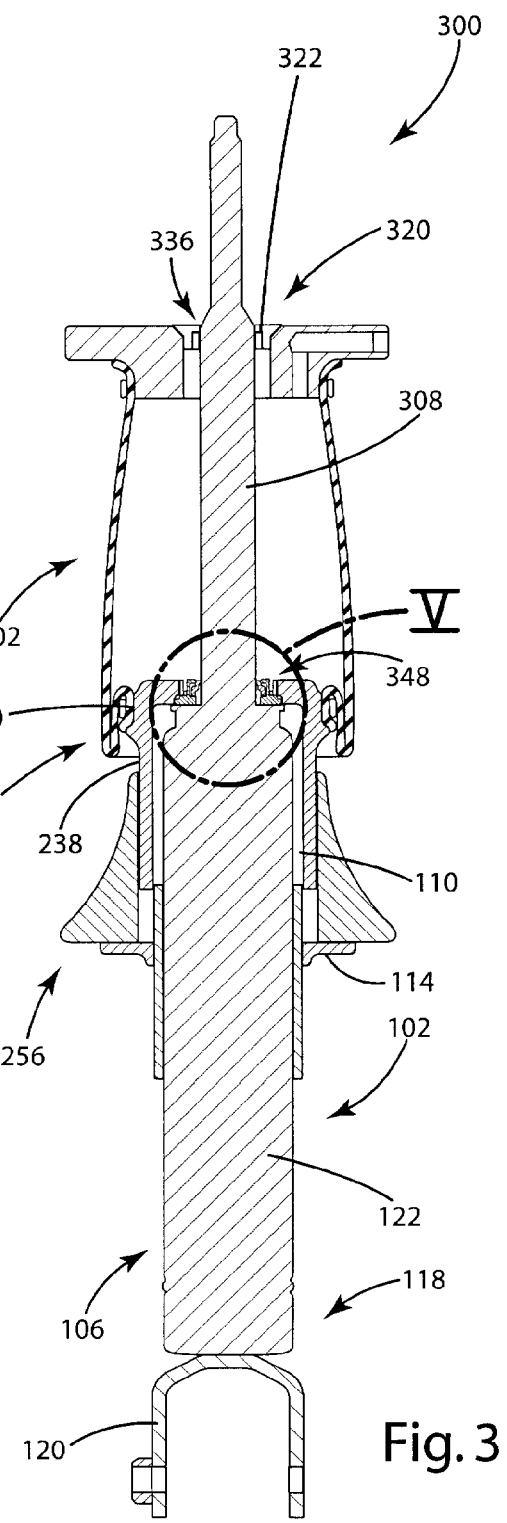
FIG. 3 is a sectional, elevation view of a second embodiment of an air-over shock absorber system, utilizing a sleeve configuration similar to that of the first embodiment shown in FIG. 2, but applied to a shock absorber having a relatively larger piston than the piston illustrated in FIG. 2.

FIG. 3 is an illustration similar to FIG. 2, showing another embodiment of a shock absorber system, referred to as air-over shock absorber system 300. System 300 is similar to shock absorber system 200, but includes a piston rod 308 which is shown as having a relatively larger diameter than the diameter of piston rod 108. For purposes of description, the piston rod 308 can be considered as having a diameter of 22 mm. Substantially all of the components utilized to convert the coil-over shock absorber system 100 to the air-over shock absorber system 200 can be identical in size and configuration for the air-over shock absorber system 300 illustrated in FIG.

3. The only components required to be of a different size are the universal puck assemblies utilized with the shock absorber system 300.

More specifically, the air-over shock absorber system 300 includes an air spring assembly 202 having a flexible member 204, upper end assembly 206 and lower end assembly 208. As with the shock absorber system 200, the shock absorber system 300 also includes universal puck assemblies. With reference to FIG. 3 and FIGS. 13, 14 and 15, the shock absorber system 300 includes a first universal puck assembly 320 at an upper end of the flexible member 204. The first universal puck assembly 320 includes a universal puck 322, O-ring 324 and lip seal 326. Each of these components has the same configuration as the components of the first universal puck assembly 220 and second universal puck assembly 248 previously described with respect to the shock absorber system 200. Further, the universal puck 322 includes an aperture 336 extending therethrough. Although the first universal puck assembly 320 has a substantially identical configuration to the first universal puck assembly 220 associated with the shock absorber system 200, the aperture 336 extending through the universal puck 322 is of a diameter sized so as to fit the 22 mm piston rod 308 shown in FIG. 3. As previously described herein, the aperture 236 of the universal puck 250 associated with shock absorber system 200 is sized so as to fit the piston rod 108, which is characterized as having a diameter of 14 mm.

Along with the first universal puck assembly 320, the shock absorber system 300 also includes a second universal puck assembly 348 positioned at the lower end of the flexible member 204. The positioning and configuration of the second universal puck assembly 348 corresponds to the positioning and configuration of the second universal puck assembly 248 associated with the shock absorber system 200. The second universal puck assembly 348, as primarily shown in FIG. 5, has the same size and configuration as the first universal puck assembly 320. Relative to the first universal puck assembly 220 associated with the shock absorber system 200, the second universal puck assembly 348 includes a universal puck 350 with an aperture extending therethrough sized so as to fit the piston rod 308 having a diameter of 22 mm.

In accordance with the foregoing, the components necessary for conversion from a coil-over shock absorber system to an air-over shock absorber system differ for use with a piston rod of a first diameter relative to a system having a piston rod of a second diameter, only with respect to the diameters of the apertures extending through the associated universal puck assemblies. Accordingly, the manufacture and preparation of conversion kits for converting from coil-over to air-over shock absorber systems is substantially facilitated, in that the conversion kits need differ for differing sized piston rods only with respect to the universal puck assemblies. Also, even for differences in piston rod diameters, the differences in the requisite universal puck assemblies vary only with respect to the diameter of the apertures extending therethrough. That is, the overall shape and configuration of the universal puck assemblies do not change as a result of differing piston rod diameters. The concept that for conversion components for systems having differing piston rod diameters, only the diameters of apertures within universal puck assemblies need to be modified, facilitates manufacture, simplicity and assembly of conversion kits.

Figure 6:
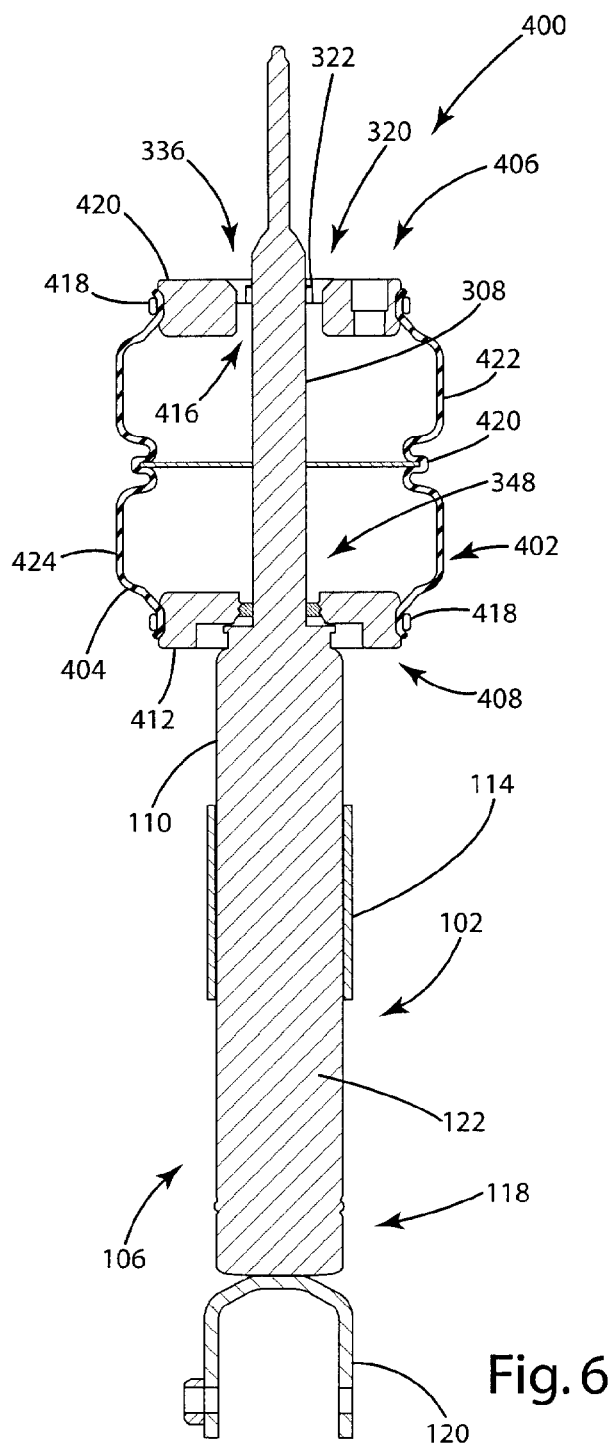
FIG. 6 is a sectional, elevation view of a third embodiment of an air-over shock absorber system, similar to the systems illustrated in FIGS. 2 and 3, but using a bellows instead of a sleeve.

A further embodiment of a shock absorber system is illustrated in FIG. 6 and is identified as a bellows shock absorber system 400. Concepts associated with shock absorber systems employing bellows devices are relatively well known in the art. For example, an adjustable suspension system employing a bellows type air spring is disclosed in Okamoto, U.S. Pat. No. 6,398,198 issued Jun. 4, 2002. The bellows shock absorber system 400 illustrated in FIG. 6 employs a shock absorber 102, substantially corresponding to the shock absorber 102 illustrated in FIG. 3. More specifically, the shock absorber 102 includes a cylinder 106 having an upper end 110 and lower end 118, with a clevis 120 attached to the lower end 118. The cylinder 106 includes an inner chamber 122. Also included is a piston rod, shown in FIG. 6 as piston rod 308, which corresponds to the 22 mm piston rod 308 illustrated in FIG. 3 and previously described with respect to the shock absorber system 300. Although the shock absorber system 400 is illustrated with the 22 mm piston rod 308, it should be emphasized that numerous other sizes of piston rods could be employed, such as the 14 mm piston rod 108 previously described with respect to the shock absorber system 200.

The bellows shock absorber system 400 includes a bellows assembly 402. The bellows assembly 402 includes a bellows 404 having a bellows body 422. The bellows body 422 in the shock absorber system 400 is a two-stage air spring (which could employ gases other than air, or fluids). The bellows body 422 has first and second open ends and a hollowed cylindrical shape. The upper end is enclosed by an upper end assembly 406, while the lower end is enclosed by a lower end assembly 408. Crimp rings 418 are used to secure the bellows body 422 to the upper and lower assemblies 406, 408, respectively. The bellows body 422 includes a pair of diametrically relatively larger portions 424 vertically aligned along a longitudinal access of the bellows body 422. Correspondingly, relatively smaller diametric portions 426 of the bellows body 422 are located at the upper and lower ends of the body 422 and between the diametrically larger portions 424.

The upper end assembly 406 includes an upper end cap 410. The upper end cap 410 is sized and configured so as to be fitted within the upper end of the bellow body 422, with the crimp ring 418 secured around the bellows body 422 and the upper end cap 410. The upper end cap 410 includes an aperture 416 extending vertically therethrough. The aperture 416 is sized and configured so as to receive the first universal puck assembly 320 previously described with respect to use with the shock absorber system 300 illustrated in FIG. 3. As previously described, the first universal puck assembly 320 includes a universal puck 322 (sized so as to be fitted within the upper end cap 410 and to be fitted around the 22 mm piston rod 308). Also included with the universal puck assembly 320 is an O-ring 324 and lip seal 326. In this manner, the bellows assembly 402 is sealed at one end directly to the piston rod 308.

Correspondingly, the bellows assembly 402 includes a lower end assembly 408 having a lower end cap 412. The lower end cap 412 is secured within the lower end of the bellows body 422, with a crimp ring 418 fitted around the lower end of the bellows body 422 and, the end cap 412. The lower end cap 412 is sized and configured so as to receive the second universal puck assembly 348 as shown in FIG. 6. It should be noted that the second universal puck assembly 348 may be identical to the second universal puck assembly 348 utilized with the shock absorber system 300 and previously described with respect to its illustration in FIG. 3. The second universal puck assembly 348, as previously described, employs a universal puck 350, O-ring 352 and lip seal 354. The second universal puck assembly 348 provides a seal between the lower end of the bellows body 422 and the piston rod 308. In particular, the second universal puck assembly 348 provides for a direct seal of the lower end of the bellows assembly 402 to the piston rod 308. In this manner, all seals associated with the bellows assembly 402 are directly to the piston rod 308.

As with the previously described shock absorber systems 200 and 300, the only components which would be required to differ if the shock absorber system 400 utilized a piston rod of different diameter would be the sizes of the apertures extending through the first and second universal puck assemblies 320 and 348, respectively. Also, it should again be emphasized that the first universal puck assembly 320 may be identical to the second universal puck assembly 348.

Three embodiments of conversion assemblies have now been described. Specifically, these are systems 200, 300 and 400. With the shock absorber systems, coil-over shock absorber systems employing coil springs are replaced through the use of conversion components resulting in air-over shock absorber systems. In each of the embodiments shown herein, the conversions result in the air spring having upper and lower ends sealing only on the piston rod. Such direct sealing to the piston rod (without requiring sealing to other components of the shock absorber system) provide for tighter and more efficient seals, with reduced probability of leakage. Also, as earlier stated, this type of direct sealing simplifies retrofit to multiple damper types (or manufacturers) with common rod diameters. Also, as earlier mentioned, common damper rod seals are not designed to be exposed to high pressure external air. Sealing to the rod on the bottom eliminates the problem of this high pressure air bypassing the rod seal and over-pressuring the damper. Also, the conversion assemblies employ universal puck assemblies. If a particular conversion assembly is desired by a user (e.g. flexible sleeve member, bellows), and the user wishes to employ the conversion assemblies with piston rods of differing diameters, the only modifications necessary for the components of the conversion assemblies are the universal puck assemblies. That is, and as an example, the end caps utilized for the flexible sleeve type air springs will be the same, whether the conversion assemblies are to be utilized with a 14 mm piston rod diameter or a 22 mm piston rod diameter, or a piston rod of any other diameter. This "modularity" with respect to the universal puck assemblies allows for substantial flexibility in inventory, as well as inventory efficiency. Also, when packaging components for particular conversion assemblies, the only components required to differ, for differing piston rod diameters, are the universal puck assemblies.

Still further, the air-over shock absorber systems 200 and 300 (illustrated in FIGS. 2 and 3, respectively) employ a rate adjustable piston 256, as previously described herein. The rate adjustable piston, or "spring piston," can utilize the original threaded coil-over shock absorber cylinder body so as to adjust the position of the rate adjustable piston 256 longitudinally along the outer surface of the shock absorber cylinder. Such adjustment provides for the capability of adjusting the "spring rate" for any given application of the conversion assemblies.

Modular control systems in accordance with the invention will now be described with respect to FIGS. 16-29. With respect to the unique needs of the vehicle aftermarket, modular control systems in accordance with the invention meet customer needs by having the capability of using a single driver interface unit. The single driver interface unit can communicate with multiple controlled services. Still further, control systems in accordance with the invention offer both simplified wired and wireless configurations. A wired configuration is advantageous because of its low cost, while a wireless configuration facilitates installation. Still further, control systems in accordance with the invention may offer "smart" communications, which allow multiplexing of one or more services to the single driver interface unit. Still further, control systems in accordance with the invention can utilize a common display unit for air suspension control, damper control and the like. This can occur while also providing for common air control units for two point or four point suspension control.

With these configurations of control systems in accordance with the invention, several markets for vehicles can be served. For example, with respect to automobiles and light to medium truck vehicles, load assist products can be provided with one and two point air suspensions. Still further, full height control can be provided with four point air suspensions. Adjustable damper control can also be provided, either through air pressure control or electronic screw-motor control. With respect to the heavy truck market, load assist products can also be provided with one and two point air suspension. It should be noted that the heavy truck market can also be provided with on-board air supply. Full height control can be provided with four point air suspensions, and adjustable damper control can be provided either through air pressure control or electronic screw-motor control. For motor homes, hydraulic jack leveling control can be provided. Still further, specialty markets can be served, where one or more points of air control may be required. This may occur with respect to equipment isolation, vibration damping and other desired features.

Still further, with respect to modular control systems in accordance with the invention, numerous functions can be controlled, including engine operation, damper function and the like. Further, air suspension, damper control and the like can be achieved with modularity of components, and associated interchangeability of components. That is, modular control systems in accordance with the invention provide the ability for the aftermarket to adapt a common architecture for multiple functions. In this regard, modular control systems in accordance with certain aspects of the invention consist of an open architecture system, in that driver interface units and control units can be selectively, mechanically and electrically interconnected to each other, with the additional units using the common architecture.

Figure 16:
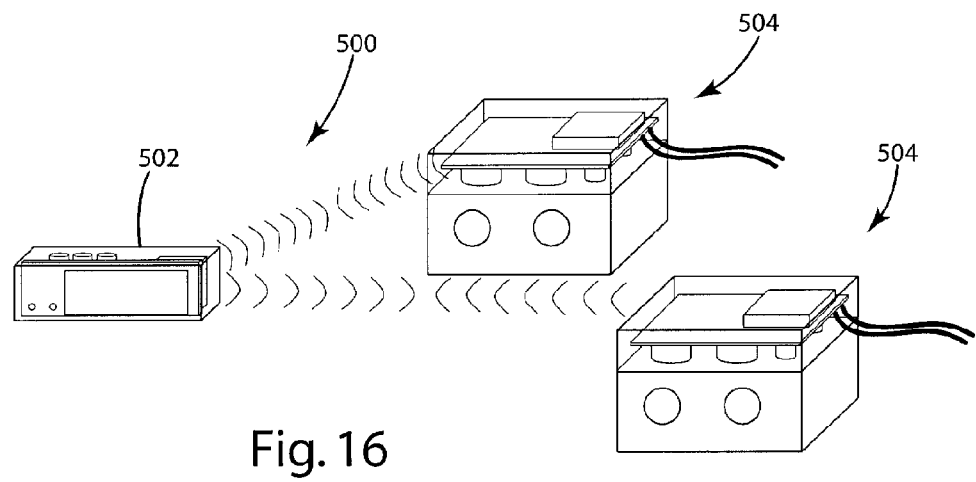
FIG. 16 is a partially schematic and partially block diagram illustration of a wireless control system in accordance with the invention.

Turning to the illustrations, FIG. 16 illustrates a wireless modular control system in accordance with the invention. The wireless modular control system is referred to as system 500, and is shown in block diagram form therein. The wireless control system 500 includes a driver interface unit 502. As shown in FIG. 16, the driver interface unit 502 can include a radio, main display and battery power. Spacial signals can be transmitted as RF signals, such as at a frequency of 2.4 GHz. Such signals can be transmitted to air control units, identified in FIG. 16 as control units 504. Each of the control units 504 can include a main display, along with a radio. Pressure sensors can be provided, as well as coils and a manifold. The air control units 504 are not only capable of receiving RF spacial signals from the driver interface unit 502, but are also capable of transmitting corresponding RF signals to the interface unit 502.

Figure 17:
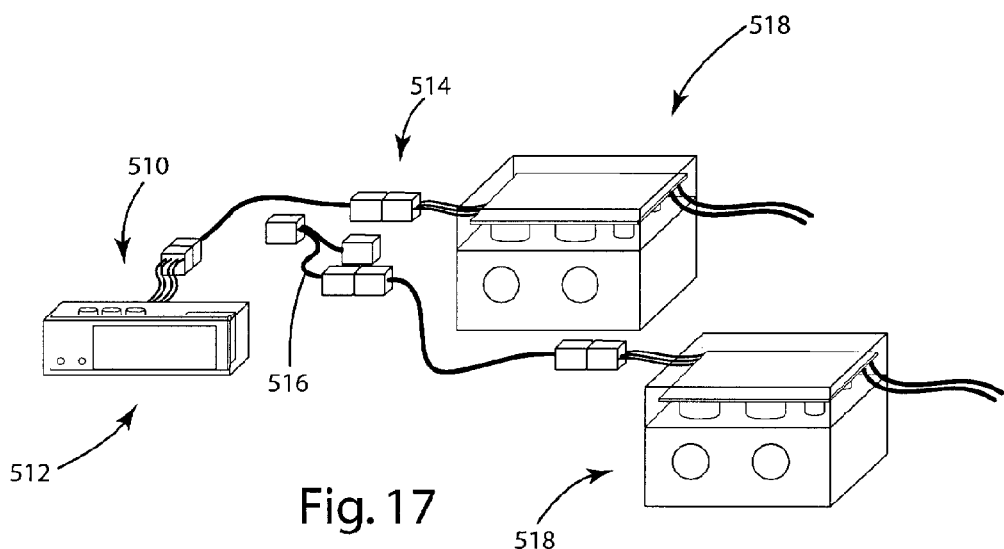
FIG. 17 is a view similar to FIG. 16, showing a wired control system in accordance with the invention.

FIG. 17 illustrates a wired modular control system 510 in accordance with the invention. The wired control system 510 can include a driver interface unit 512, with the interface unit 512 having a main display and CAN hardware. A wiring harness utilizing, for example, Yazaki four-pin connectors 514 can be employed. Jumper harness 516 can also be employed, for additional air control units. The driver interface unit 512 can thus be wired to air control units 518. The air control units 518 can, like the interface unit 512, include CAN hardware, as well as a main PCB, pressure sensors, coils and a manifold. Multiple air control units 518 can be employed.

Figure 18:
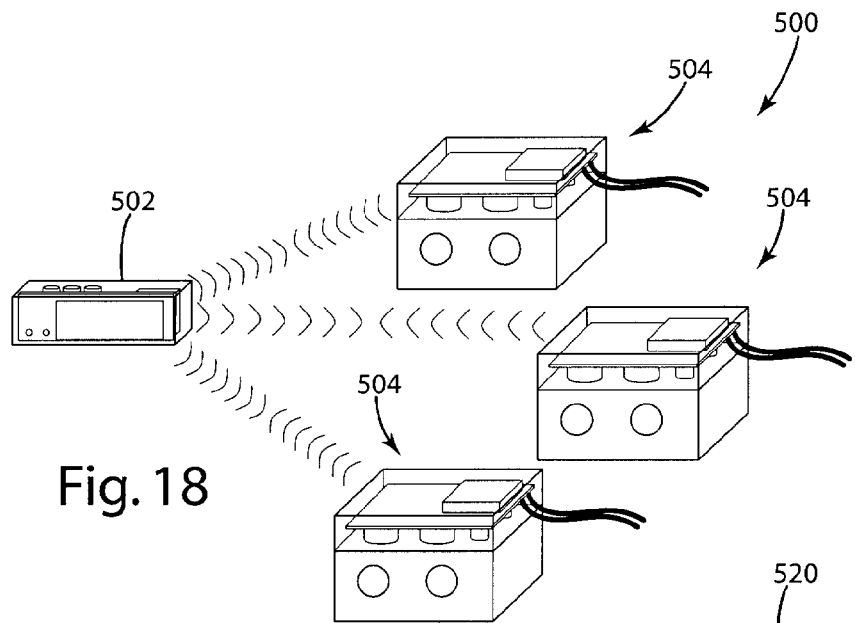
FIG. 18 illustrates the communications associated with the wireless system, employing modular radio and control units.
Figure 19:
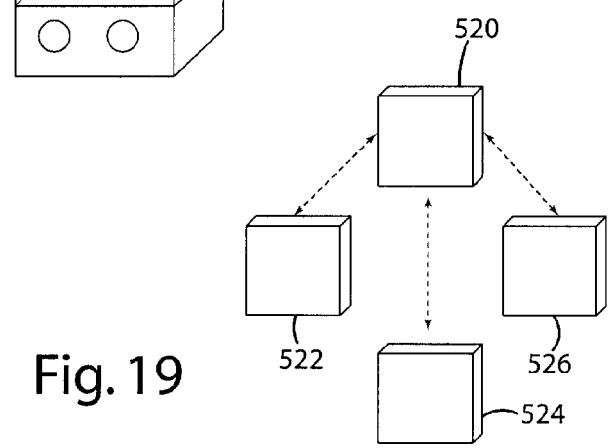
FIG. 19 illustrates the functionality associated with FIG. 18, by showing specific types of control unit radios.

FIG. 18 illustrates a block diagram of the wireless control system 500, but further showing the use of an additional air control unit 504. FIG. 19 is a schematic of the radio systems of the wireless control system 500. FIG. 19 illustrates the main display radio 520, front air control unit radio 522, rear air control unit 524, and an additional air control unit radio 526. The additional control unit radio 526 could be utilized for damper functions, engine control and the like. With these systems, modular radio units can be utilized, and displays can be battery powered. Also, these units can be characterized as comprising "ECU" units, meaning electronic control units that can read sensors, and command valves and compressors to act in accordance with embedded software control. The electronic control units can be functioning in a "marry" mode, where each control unit identifier is actually "learned" as if in an adaptive system.

Figure 20:
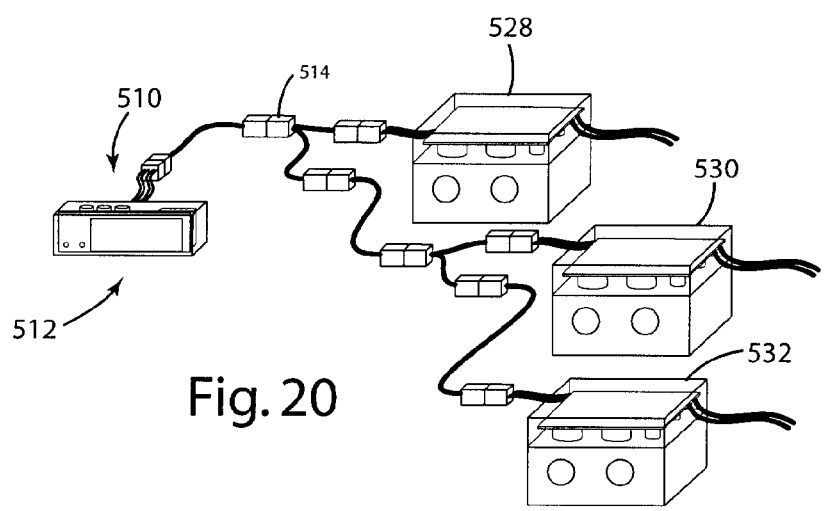
FIG. 20 illustrates the same functionality associated with FIGS. 18. and 19, within a wired mode.

FIG. 20 is similar to FIG. 18, but illustrates the wired control system 510 with a front air control unit 528, rear air control unit 530 and additional control unit 532. In this configuration, the radio can be replaced with a CAN chip, and with run connectors. Power can be supplied to displays through the control units. Jumper harnesses can be utilized for daisy-chaining, and the electronic control units can be in "marry" modes, where the CAN network is checked to find new units.

Figure 21:
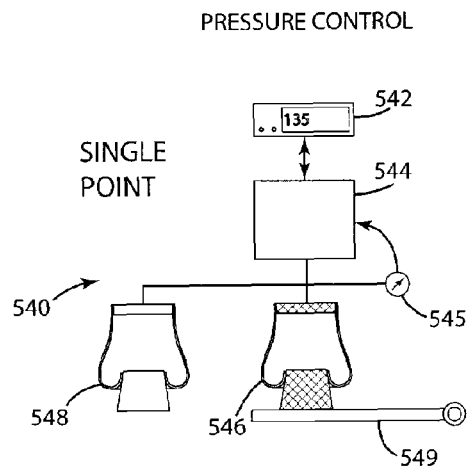
FIG. 21 illustrates a single point pressure control configuration in accordance with the invention.
Figure 22:
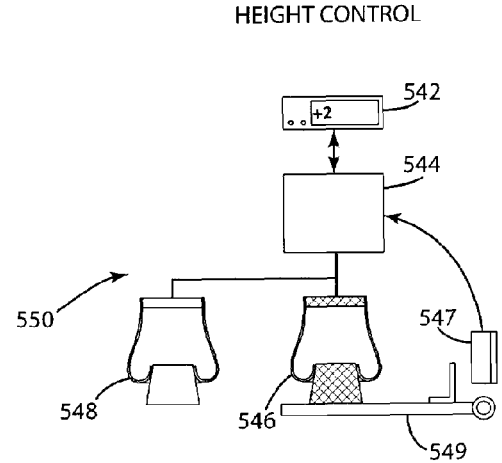
FIG. 22 illustrates a single point height control system in accordance with the invention.

FIG. 21 illustrates one type of control feature which may be utilized in accordance with the invention, characterized as a single point pressure control system 540. The single point pressure control system 540 employs a main display 542, and air control unit 544. The air control unit 544 monitors and controls an air spring 546 and additional air spring 548. A pressure sensor 545 monitors the air spring 546, which employs a control arm 549. A single point height control system is illustrated in FIG. 22, and is shown as height control system 550. The height control system 550 includes a main display 542, with an air control unit 544. An air spring 546 and additional air spring 548 are provided with the system. A control arm 549 is also utilized. In addition, the system 550 includes a height sensor 547, which monitors the height of the air spring. As with the pressure control system 540, the height control system 550 utilizes the main display 542 with a driver interface, so that the driver can set a desired suspension height (or desired air spring pressure, as with system 540). The air control unit 544 transmits signals to the display 542, indicating actual suspension height and also providing various system diagnostics.

Figure 23:
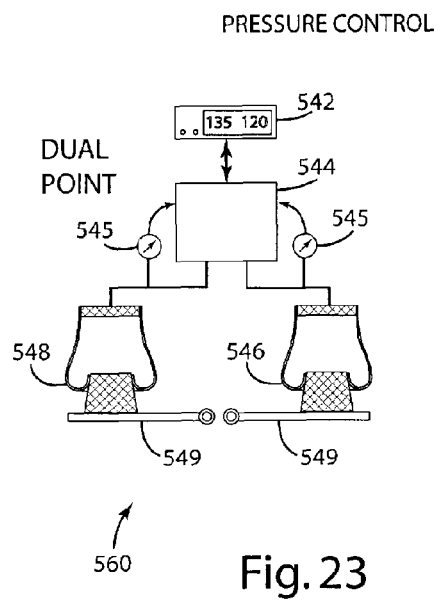
FIG. 23 illustrates a dual point pressure control system in accordance with the invention.

FIG. 23 illustrates a dual point pressure control system 560. The dual point pressure control system 560 is similar to the single point system 540, but utilizes two pressure sensors 545, which monitor both the additional air spring 548 and air spring 546.

Figure 24:
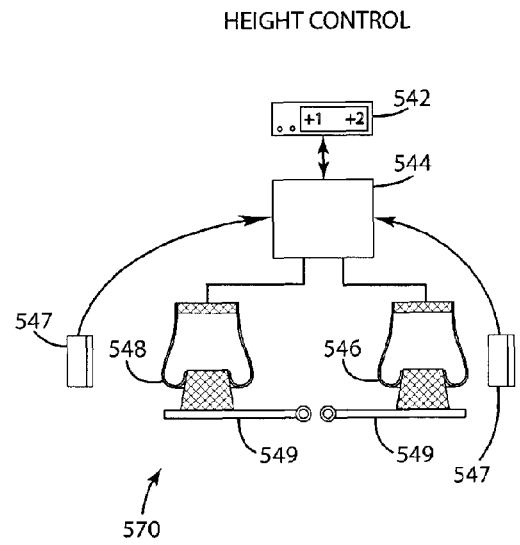
FIG. 24 illustrates a dual point height control system in accordance with the invention.

FIG. 24 illustrates a dual point height control system 570. The system 570 includes the display 542 and air control unit 544. Instead of a single height sensor 547, the system 570 employs a pair of height sensors 547. The sensors 547 are utilized to sense the height of both air spring 546 and air spring 548.

Figure 25:
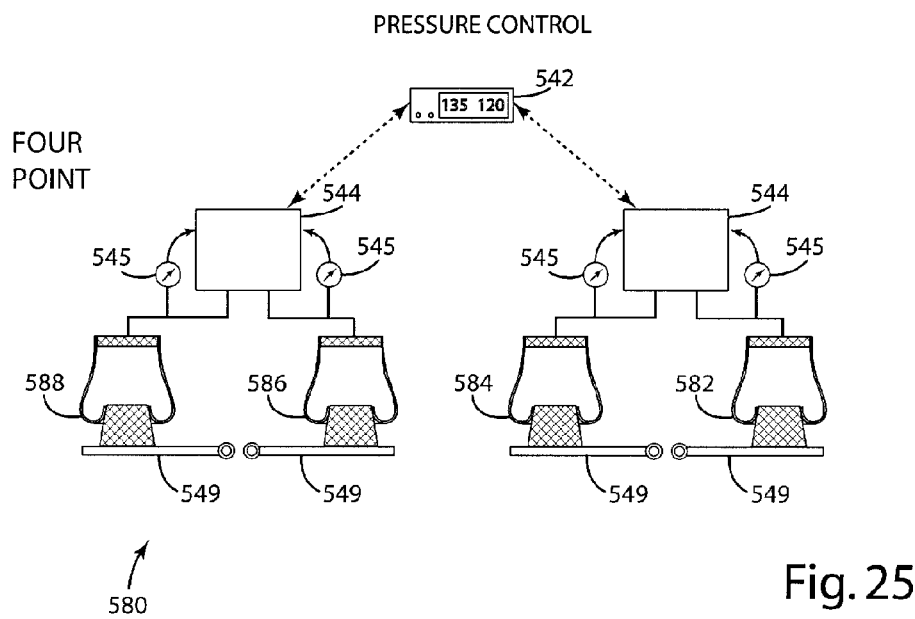
FIG. 25 illustrates a four point pressure control system in accordance with the invention.

FIG. 25 illustrates a four point pressure control system 580. In this system, a single display unit 542 is utilized, along with a pair of air control units 544. Four pressure sensors 545 are utilized, to monitor pressure in air springs 582, 584 of the rear axle, and air springs 586, 588 of the front axle.

Figure 26:
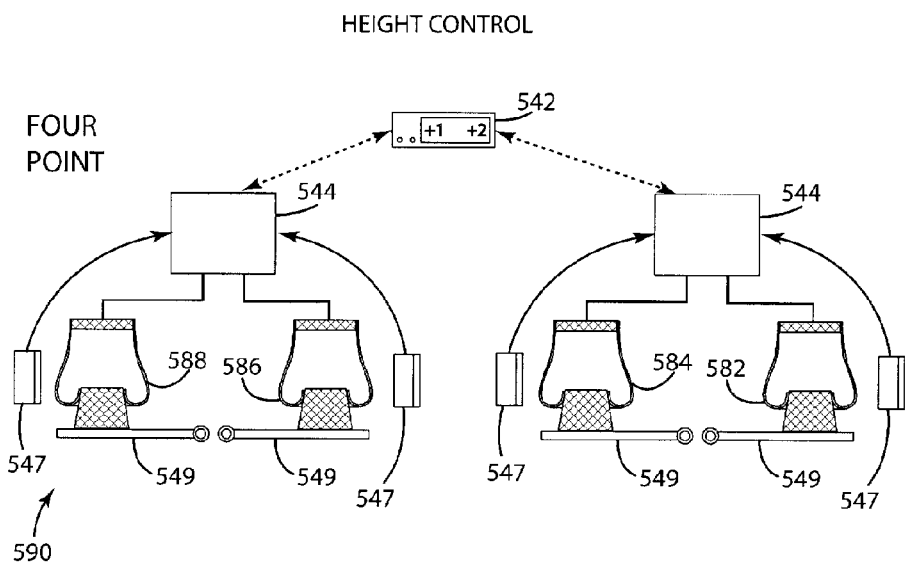
FIG. 26 illustrates a four point height control system in accordance with the invention.

Similarly, FIG. 26 illustrates a four point height control system 590. The four point height control system 590 includes a main display 542 and two air control units 544. The air springs 582, 584 of the rear axle each have a height sensor 547 associated therewith. Correspondingly, the air springs 586, 588 of the front axle also each have a height sensor 547 associated therewith.

FIG. 27 illustrates the schematics associated with an air control unit 544. The control unit 544 is shown with an air spring 546, and a manifold 600. The manifold 600 includes a "pressure increase" valve 602 and a "pressure reduction" valve 604. The unit 600 can be characterized as a single point unit.

FIG. 28 illustrates a dual point air control unit 610, with a dual point manifold 606. The dual point manifold 606 is coupled to the air springs 546 and 548. A pressure increase valve 602 is provided as a common increase valve for both air springs 546, 548. Correspondingly, separate pressure reduction valves 604 are provided for each of the air springs 546, 548 within the manifold 606.

Still further, FIG. 29 illustrates a four point air control unit schematic showing a four point air control unit 630. The four point air control unit 630 includes a four point manifold 620. The four point manifold 620 includes a rear manifold 621 and a front manifold 622. The rear manifold 621 is coupled to the air springs 582 and 584. The front manifold 622 is coupled to the air springs 586 and 588. The four point air control unit 630 also includes a common pressure increase valve 602, coupled to a tank 608. As shown in FIG. 29, a pressure reduction valve 604 is associated with air spring 582, while another pressure reduction valve 604 is associated with air springs 584 and 586 in a common manner. Correspondingly, a third pressure reduction valve 604 is associated with air spring 588. In this configuration, a four point air control unit 630 is provided.

With respect to a substantial portion of the foregoing, it should be emphasized that the driver interface unit PCB and air control unit PCB may be designed so as to allow flexible mounting of either the radio/battery combination, or the CAN hardware and flying leads to the connectors. Still further, the wired units may have one connector per unit, with a jumper harness that can allow additional control units to be daisy chained.

FIG. 30 illustrates a dual point air pressure control unit 640. The unit 640 differs from the previously described dual point units in that there is an absence of an air tank in the pressure control unit 640. With reference to FIG. 30, the air pressure control unit 640 includes a motorized compressor unit 642, shown in a schematic format as having a conventional motor 644 and air compressor 646. The compressor unit 642 is connected to a manifold 648. The manifold 648 is similar to those previously described herein, and includes three solenoid valves. Specifically, one solenoid valve 652 is connected directly to an air spring 654. Correspondingly, a second solenoid valve 652 is connected to another one of the two air springs 656. The manifold 648 also includes a solenoid exhaust valve 650.

FIG. 31 illustrates a pressure control unit configuration similar to the air pressure control unit 640. Specifically, the pressure control unit illustrated in FIG. 31 can be characterized as a three-solenoid pressure control unit 660. The control unit 660 includes a compressor 662 connected directly to a manifold 664. The manifold 664 includes an exhaust solenoid valve 666 and solenoid valves 668 and 670. The solenoid valve 668 is connected through a push-to connect fitting 676 to an air spring 672. Correspondingly, another solenoid valve 670 is connected through a different push-to-connect fitting 676 to the air spring 674. As with other control units described herein, the control unit 660 does not require any type of air tank, supply pressure sensor or tap.

FIG. 32 illustrates a three solenoid air pressure control unit 680, with the control unit 680 having an air tank 690. The control unit 680 includes a manifold 682 having three solenoid valves, namely solenoid valves 684, 686 and 688. The air tank 690 is connected directly to the solenoid valve 684 through a push-to-connect fitting 676. The solenoid valve 686 is connected directly to an air spring 690 through another push-to-connect fitting 676. Correspondingly, solenoid valve 688 is connected directly to an air spring 692 through a further push-to-connect fitting 676. A push-to-connect fitting 676 is also utilized to provide a supply line for an external compressor with exhaust.

Figures 33, 34:
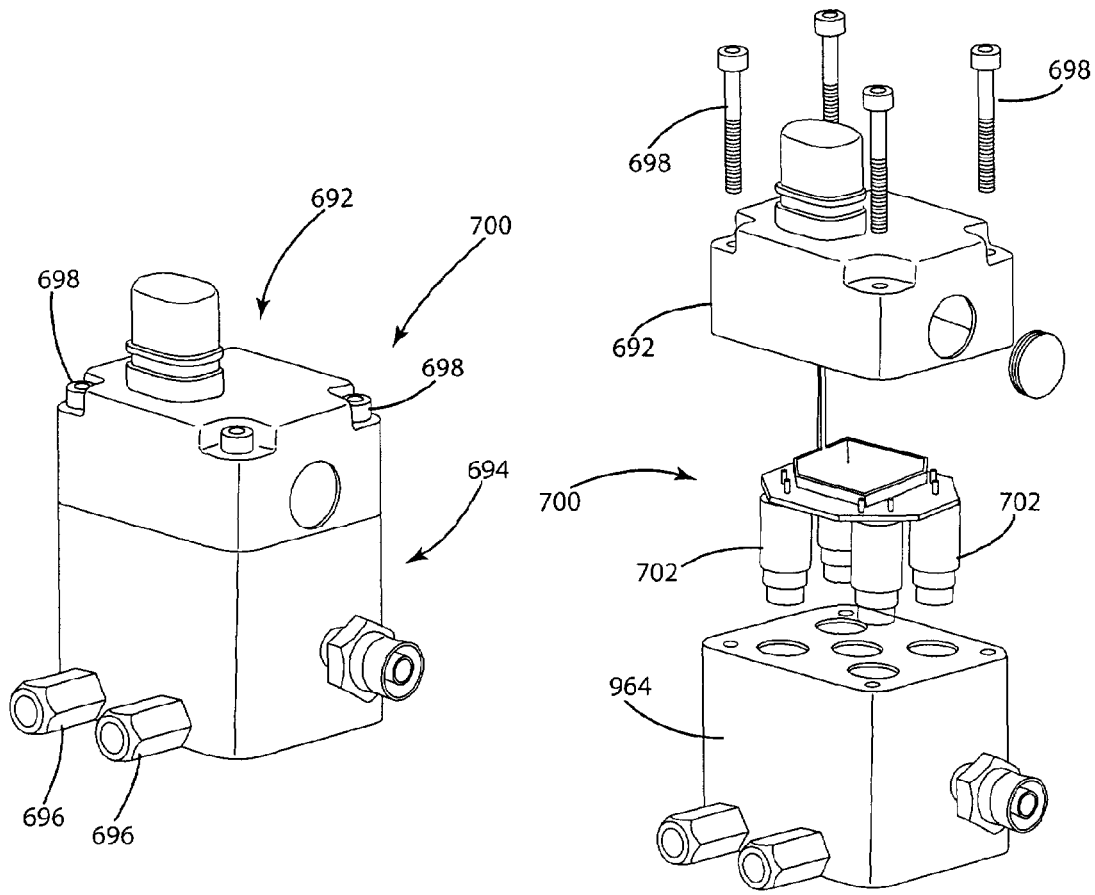
FIG. 33 is a perspective view of a manifold which may be utilized in accordance with the invention.
FIG. 34 is a perspective and exploded view of the manifold shown in FIG. 33.

FIGS. 33 and 34 illustrate one embodiment of a manifold which may be utilized in accordance with the invention. Specifically, FIGS. 33 and 34 illustrate a manifold 700. The manifold 700 includes a cover 692 which is connectable to a lower base 694. Connection means can include the screw bolts 698 illustrated in the drawings. As illustrated in the exploded view of FIG. 34, solenoid valves 702 can be inserted into the manifold 700, as desired. In the particular embodiment shown herein, four solenoid valves 702 are being utilized. However, as apparent from FIG. 34, it would be possible to incorporate five solenoid valves within the manifold 700.

It will be apparent to those skilled in the pertinent arts that other embodiments of modular control systems in accordance with the invention can be designed. That is, the principles of modular control systems in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

What is claimed is:

1. A modular system for controlling a supply of pressurized air to a plurality of vehicle air suspension systems in response to an input from a vehicle driver, the system comprising:
    a first air control unit including
        a first housing with a plurality of first internal air passages defining a first manifold receiving the supply of pressurized air, wherein at least one of the first air passages is in fluid communication with a first selected one of the air suspension systems,
        a first air pressure sensor on the housing in communication with one of the first air passages generating an output representative of an air pressure achieved in the one of the first air passages,
        a plurality of first valves on the housing controlling a flow of the supply of pressurized air through the first air passages, and
        a first unit controller on the first housing operating the first valves in response to the output of the first pressure sensor and a first control signal generated externally of the first air control unit, the first unit controller further generating a first return signal based on the output of the first air pressure sensor;
    a first driver interface in communication with the first unit controller, the first driver interface generating the first control signal in response to the driver input and receiving the first return signal from the first unit controller, the first driver interface displaying information representative of the air pressure achieved in the one of the first air passage based on the first return signal; and
    a second air control unit including
        a second housing with a plurality of second internal air passages defining a second manifold receiving the supply of pressurized air, wherein at least one of the second air passages is in fluid communication with a second selected one of the air suspension systems,
        a second air pressure sensor on the housing in communication with one of the second air passages generating an output representative of an air pressure achieved in the one of the second air passages,
        a second valve on the housing controlling a flow of the supply of pressurized air through one of the second air passages, and
        a second unit controller operating the second valve in response to the control signal generated externally of the first air control unit and at least one of the output of the first pressure sensor and the output of the second pressure sensor, the second unit controller generating a second return signal based on the output of the second air pressure sensor,
        wherein the first driver interface receives the second return signal from the second unit controller, and the first driver interface displays information representative of the air pressure achieved in the one of the second air passages based on the second return signal.

2. The modular system of claim 1, wherein the second manifold of the second air control unit is directly connected to the first manifold of the first air controller.

3. The modular system of claim 2, further comprising a second driver interface in communication with the first unit controller and the second unit controller, the second driver interface generating a second control signal in response to the driver input, receiving the first and second return signals from the first and second unit controllers, and displaying information representative of the air pressure achieved in the one of the first air passages based on the first return signal and the one of the second air passages based on the second return signal.

4. A modular system for controlling a supply of pressurized air to a plurality of vehicle suspension systems in response to an input from a vehicle driver, the system comprising:
    a first driver interface generating a control signal in response to the driver input, the first driver interface including a display;
    a first air control unit remote from the first driver interface, the first air control unit including
        a first housing with a plurality of first internal air passages defining a first manifold receiving the supply of pressurized air, wherein one of the first air passages is in fluid communication with a first one of the suspension systems,
        a first sensor generating a first output representative of one of a first air pressure achieved in the one of the first air passages and a first height achieved by the first one of the suspension systems,
        a plurality of first valves on the housing controlling a flow of the supply of pressurized air through the first air passages, and
        a first unit controller on the first housing in communication with the first driver interface, wherein the first unit controller operates the first valves in response to the control signal and the output of the first sensor, and the first unit controller generates a first return signal based on the output of the first sensor; and
    a second air control unit remote from the first driver interface, the second air control unit including
        a second housing with a plurality of second internal air passages defining a second manifold receiving the supply of pressurized air, wherein at least one of the second air passages is in fluid communication with a second one of the air suspension systems, a second sensor generating a second output representative of one of a second air pressure achieved in the one of the second air passages and a second height achieved by the second one of the suspension systems, a second valve on the housing controlling a flow of the supply of pressurized air through one of the second air passages, and a second unit controller on the second housing in communication with the first driver interface and the first unit controller, the second unit controller operating the second valve in response to the control signal and at least one of the output of the first sensor and the output of the second sensor, and the second unit controller generates a second return signal based on the output of the second air pressure sensor, wherein the first driver interface displays information representative of the air pressure achieved in the one of the first air passages and second air passages based on the first and second return signal.

5. The modular system of claim 4, wherein the first sensor is a first air pressure sensor on the first housing in communication with one of the first air passages, and wherein the first output is representative of an air pressure achieved in the one of the first air passages.

6. The modular system of claim 4, wherein the second manifold of the second air control unit is directly connected to the first manifold of the first air control unit.

7. The modular system of claim 6, further comprising an air tank mounted on the first housing of the first air control unit in communication with the first manifold of the first air control unit and the second manifold of the second air control unit.

8. The modular system of claim 4, wherein the control signal generated by the first driver interface is a first control signal, and further comprising a second driver interface in communication with the first unit controller, the second driver interface generating a second control signal in response to the driver input.

9. The modular system of claim 4, wherein the first driver interface unit provides a numeric display of the air pressure achieved at one of the air suspension systems.

10. The modular system of claim 4, wherein the first driver interface unit provides a numeric display of a desired air pressure to be achieved at one of the air suspension systems.

* * * * *